(12) United States Patent
Deaguero et al.

(10) Patent No.: US 10,594,718 B1
(45) Date of Patent: *Mar. 17, 2020

(54) MANAGING INCIDENT RESPONSE OPERATIONS BASED ON MONITORED NETWORK ACTIVITY

(71) Applicant: ExtraHop Networks, Inc., Seattle, WA (US)

(72) Inventors: Joel Benjamin Deaguero, Silverdale, WA (US); Edmund Hope Driggs, Seattle, WA (US); Xue Jun Wu, Seattle, WA (US); Nicholas Jordan Braun, Seattle, WA (US); Michael Kerber Krause Montague, Lake Forest Park, WA (US); Michael Christopher Kelly, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,509

(22) Filed: Aug. 21, 2018

(51) Int. Cl.
*G06F 11/00* (2006.01)
*H04L 29/06* (2006.01)
(Continued)

(52) U.S. Cl.
CPC .......... *H04L 63/1425* (2013.01); *G06N 5/04* (2013.01); *G06N 20/00* (2019.01);
(Continued)

(58) Field of Classification Search
CPC .......... H04L 2463/141; H04L 63/1408; H04L 63/1416; H04L 63/1425; H04L 63/1441; H04L 63/1458
(Continued)

(56) References Cited

U.S. PATENT DOCUMENTS

| 5,027,269 A | 6/1991 | Grant |
| 5,430,727 A | 7/1995 | Callon |

(Continued)

FOREIGN PATENT DOCUMENTS

| CN | 109542772 A | 3/2019 |
| WO | 2016144932 A1 | 9/2016 |

OTHER PUBLICATIONS

Official Communication for U.S. Appl. No. 12/326,672 dated Jun. 9, 2010.

(Continued)

*Primary Examiner* — Gary S Gracia
(74) *Attorney, Agent, or Firm* — John W. Branch; Lowe Graham Jones PLLC

(57) ABSTRACT

Embodiments are directed to monitoring network traffic associated with networks to provide metrics. A monitoring engine may determine an anomaly based on the metrics exceeding threshold values. An inference engine may be instantiated to provide an anomaly profile based on portions of the network traffic that are associated with the anomaly. The inference engine may provide an investigation profile based on the anomaly profile such that the investigation profile includes information associated with investigation activities associated with an investigation of the anomaly. The inference engine may monitor the investigation of the anomaly based on other portions of the network traffic such that the other portions of the network traffic are associated with monitoring an occurrence of the investigation activities. The inference engine may modify a performance score associated with the investigation profile based on the occurrence of the investigation activities and a completion status of the investigation.

30 Claims, 20 Drawing Sheets

(51) Int. Cl.
*H04L 12/26* (2006.01)
*H04L 12/24* (2006.01)
*H04L 29/08* (2006.01)
*G06N 5/04* (2006.01)
*G06N 20/00* (2019.01)
*G06F 12/14* (2006.01)

(52) U.S. Cl.
CPC .......... *H04L 41/0645* (2013.01); *H04L 41/14* (2013.01); *H04L 43/062* (2013.01); *H04L 43/08* (2013.01); *H04L 43/16* (2013.01); *H04L 67/30* (2013.01)

(58) Field of Classification Search
USPC .............................................. 726/22, 23, 25
See application file for complete search history.

(56) References Cited

U.S. PATENT DOCUMENTS

| | | |
|---|---|---|
| 5,541,995 A | 7/1996 | Normile et al. |
| 5,715,464 A | 2/1998 | Crump et al. |
| 5,787,237 A | 7/1998 | Reilly |
| 5,802,599 A | 9/1998 | Cabrera et al. |
| 5,835,726 A | 11/1998 | Shwed et al. |
| 5,857,188 A | 1/1999 | Douglas |
| 5,928,363 A | 7/1999 | Ruvolo |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | DiGiorgio et al. |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,704,311 B1 | 3/2004 | Chuah et al. |
| 6,704,874 B1 | 3/2004 | Porras et al. |
| 6,765,909 B1 | 7/2004 | Sen et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,999,729 B2 | 2/2006 | Wandel |
| 7,042,888 B2 | 5/2006 | Berggreen |
| 7,089,326 B2 | 8/2006 | Boucher et al. |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |
| 7,193,968 B1 | 3/2007 | Kapoor et al. |
| 7,313,141 B2 | 12/2007 | Kan et al. |
| 7,424,532 B1 | 9/2008 | Subbiah |
| 7,474,654 B2 | 1/2009 | Guru |
| 7,480,292 B2 | 1/2009 | Busi et al. |
| 7,535,906 B2 | 5/2009 | Engbersen et al. |
| 7,545,499 B2 | 6/2009 | Overbeck et al. |
| 7,580,356 B1 | 8/2009 | Mishra et al. |
| 7,594,273 B2 | 9/2009 | Keanini et al. |
| 7,602,731 B2 | 10/2009 | Jain |
| 7,606,706 B1 | 10/2009 | Rubin et al. |
| 7,609,630 B2 | 10/2009 | Gobeil |
| 7,619,988 B2 | 11/2009 | Shimada et al. |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,739,497 B1 | 6/2010 | Fink |
| 7,774,456 B1 | 8/2010 | Lownsbrough et al. |
| 7,864,764 B1 | 1/2011 | Ma et al. |
| 7,916,652 B1 | 3/2011 | Lima et al. |
| 7,979,555 B2 | 7/2011 | Rothstein et al. |
| 8,040,798 B2 | 10/2011 | Chandra et al. |
| 8,079,083 B1 | 12/2011 | Bennett et al. |
| 8,125,908 B2 | 2/2012 | Rothstein et al. |
| 8,185,953 B2 | 5/2012 | Rothstein et al. |
| 8,411,677 B1 | 4/2013 | Colloff |
| 8,619,579 B1 | 12/2013 | Rothstein et al. |
| 9,158,604 B1 | 10/2015 | Christodorescu et al. |
| 9,183,573 B2 | 11/2015 | Tseng |
| 9,189,318 B2 | 11/2015 | Li et al. |
| 9,191,400 B1 | 11/2015 | Ptasinski et al. |
| 9,357,410 B2 | 5/2016 | Nedeltchev et al. |
| 9,380,489 B2 | 6/2016 | Kotecha et al. |
| 9,391,866 B1 | 7/2016 | Martin et al. |
| 9,400,871 B1 | 7/2016 | Hewinson |
| 9,426,036 B1 | 8/2016 | Roy |
| 9,461,875 B2 | 10/2016 | Groat |
| 9,483,742 B1 | 11/2016 | Ahmed |
| 9,516,053 B1 * | 12/2016 | Muddu ................ G06F 3/0482 |
| 9,692,658 B2 | 6/2017 | Guo et al. |
| 9,715,820 B1 | 7/2017 | Boss et al. |
| 9,729,416 B1 * | 8/2017 | Khanal ............... H04L 43/0823 |
| 10,009,793 B2 | 6/2018 | Wetterwald et al. |
| 10,027,689 B1 * | 7/2018 | Rathor ................ G06F 11/3006 |
| 10,028,167 B2 | 7/2018 | Calin et al. |
| 10,038,611 B1 | 7/2018 | Wu et al. |
| 10,063,434 B1 | 8/2018 | Khanal et al. |
| 10,263,883 B2 | 4/2019 | Kamble |
| 10,264,003 B1 | 4/2019 | Wu et al. |
| 10,277,618 B1 | 4/2019 | Wu et al. |
| 10,320,749 B2 | 6/2019 | Sengupta et al. |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0107953 A1 | 8/2002 | Ontiveros et al. |
| 2002/0133586 A1 | 9/2002 | Shanklin et al. |
| 2002/0152209 A1 | 10/2002 | Merugu et al. |
| 2002/0156880 A1 | 10/2002 | Mokuya |
| 2003/0093514 A1 | 5/2003 | Valdes et al. |
| 2003/0131116 A1 | 7/2003 | Jain et al. |
| 2003/0135667 A1 | 7/2003 | Mann et al. |
| 2003/0149887 A1 | 8/2003 | Yadav |
| 2003/0152094 A1 | 8/2003 | Colavito et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0233361 A1 | 12/2003 | Cady |
| 2004/0003094 A1 | 1/2004 | See |
| 2004/0047325 A1 | 3/2004 | Hameleers et al. |
| 2004/0088544 A1 | 5/2004 | Tariq |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0125553 A1 | 6/2005 | Wu et al. |
| 2005/0182833 A1 | 8/2005 | Duffie et al. |
| 2005/0201363 A1 | 9/2005 | Gilchrist et al. |
| 2005/0210242 A1 | 9/2005 | Troxel et al. |
| 2005/0234920 A1 | 10/2005 | Rhodes |
| 2005/0251009 A1 | 11/2005 | Morita et al. |
| 2005/0262237 A1 | 11/2005 | Fulton et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0075358 A1 | 4/2006 | Ahokas |
| 2006/0085526 A1 | 4/2006 | Gulland |
| 2006/0106743 A1 | 5/2006 | Horvitz et al. |
| 2006/0123477 A1 | 6/2006 | Raghavan et al. |
| 2006/0171333 A1 | 8/2006 | Shimada et al. |

(56) References Cited

U.S. PATENT DOCUMENTS

| | | |
|---|---|---|
| 2006/0174343 A1 | 8/2006 | Duthie et al. |
| 2006/0184535 A1 | 8/2006 | Kaluskar et al. |
| 2006/0230456 A1 | 10/2006 | Nagabhushan et al. |
| 2007/0039051 A1 | 2/2007 | Duthie et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0192863 A1 | 8/2007 | Kapoor et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas |
| 2008/0069002 A1 | 3/2008 | Savoor et al. |
| 2008/0130659 A1 | 6/2008 | Polland |
| 2008/0141275 A1 | 6/2008 | Borgendale et al. |
| 2008/0147818 A1 | 6/2008 | Sabo |
| 2008/0172416 A1* | 7/2008 | Ito .......................... G06F 21/10 |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0232359 A1 | 9/2008 | Kim et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0168657 A1 | 7/2009 | Puri et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0268605 A1 | 10/2009 | Campbell et al. |
| 2009/0292954 A1 | 11/2009 | Jiang et al. |
| 2009/0296593 A1 | 12/2009 | Prescott |
| 2010/0027432 A1* | 2/2010 | Gopalan ............... H04L 41/142 |
| | | 370/252 |
| 2010/0091770 A1 | 4/2010 | Ishikawa |
| 2010/0095367 A1 | 4/2010 | Narayanaswamy |
| 2010/0250928 A1 | 9/2010 | Goto |
| 2010/0299158 A1 | 11/2010 | Siegel |
| 2010/0316216 A1 | 12/2010 | Fukushima et al. |
| 2010/0322248 A1 | 12/2010 | Ivanov |
| 2011/0019574 A1 | 1/2011 | Malomsoky et al. |
| 2011/0055138 A1 | 3/2011 | Khanduja et al. |
| 2011/0073490 A1 | 3/2011 | Hayamizu et al. |
| 2011/0173441 A1 | 7/2011 | Bagepalli et al. |
| 2011/0280149 A1 | 11/2011 | Okada et al. |
| 2011/0320394 A1 | 12/2011 | McKeown et al. |
| 2012/0130745 A1 | 5/2012 | Jones |
| 2012/0166962 A1 | 6/2012 | Lunsford |
| 2012/0176917 A1 | 7/2012 | Matityahu et al. |
| 2012/0215328 A1 | 8/2012 | Schmelzer |
| 2012/0233694 A1 | 9/2012 | Baliga et al. |
| 2012/0243533 A1 | 9/2012 | Leong |
| 2012/0294305 A1 | 11/2012 | Rose et al. |
| 2013/0010608 A1 | 1/2013 | Ramachandran et al. |
| 2013/0042323 A1 | 2/2013 | Narayanaswamy |
| 2013/0061036 A1 | 3/2013 | Oliver |
| 2013/0064084 A1 | 3/2013 | Babbar et al. |
| 2013/0103734 A1 | 4/2013 | Boldyrev et al. |
| 2013/0166730 A1 | 6/2013 | Wilkinson |
| 2013/0176842 A1 | 7/2013 | Bauchot et al. |
| 2013/0232104 A1 | 9/2013 | Goyal et al. |
| 2013/0305357 A1 | 11/2013 | Ayyagari et al. |
| 2013/0339514 A1* | 12/2013 | Crank ................. H04L 63/1416 |
| | | 709/224 |
| 2013/0347018 A1 | 12/2013 | Limp et al. |
| 2014/0040451 A1 | 2/2014 | Agrawal et al. |
| 2014/0077956 A1 | 3/2014 | Sampath et al. |
| 2014/0109168 A1 | 4/2014 | Ashley et al. |
| 2014/0142972 A1 | 5/2014 | Hosenfeld, Jr. |
| 2014/0164584 A1 | 6/2014 | Joe et al. |
| 2014/0165207 A1* | 6/2014 | Engel .................. H04L 63/1425 |
| | | 726/25 |
| 2014/0222998 A1 | 8/2014 | Vasseur et al. |
| 2014/0223325 A1 | 8/2014 | Melendez et al. |
| 2014/0304211 A1 | 10/2014 | Horvitz |
| 2014/0344633 A1 | 11/2014 | Li et al. |
| 2015/0007314 A1* | 1/2015 | Vaughan ............. H04L 63/1441 |
| | | 726/23 |
| 2015/0023168 A1 | 1/2015 | Kotecha et al. |
| 2015/0063158 A1 | 3/2015 | Nedeltchev et al. |
| 2015/0096022 A1 | 4/2015 | Vincent |
| 2015/0134554 A1 | 5/2015 | Clais et al. |
| 2015/0199613 A1 | 7/2015 | Ruiz et al. |
| 2015/0227859 A1 | 8/2015 | Ames, II |
| 2015/0229661 A1 | 8/2015 | Balabine et al. |
| 2015/0249512 A1 | 9/2015 | Adimatyam et al. |
| 2015/0331771 A1 | 11/2015 | Conway |
| 2015/0341379 A1* | 11/2015 | Lefebvre ............. H04L 63/1425 |
| | | 726/22 |
| 2016/0026922 A1 | 1/2016 | Vasseur |
| 2016/0028755 A1 | 1/2016 | Vasseur et al. |
| 2016/0036647 A1 | 2/2016 | Gonzalez et al. |
| 2016/0055335 A1 | 2/2016 | Herwono et al. |
| 2016/0093205 A1 | 3/2016 | Boyer |
| 2016/0182274 A1 | 6/2016 | Kiesekamp et al. |
| 2016/0219066 A1 | 7/2016 | Vasseur et al. |
| 2016/0262044 A1 | 9/2016 | Calin et al. |
| 2016/0294870 A1 | 10/2016 | Banjerjee et al. |
| 2016/0301709 A1 | 10/2016 | Hassanzadeh |
| 2016/0308725 A1 | 10/2016 | Tang et al. |
| 2016/0357964 A1* | 12/2016 | Mulchandani ........ G06F 21/566 |
| 2016/0357967 A1* | 12/2016 | Mulchandani .......... G06F 21/57 |
| 2016/0359872 A1 | 12/2016 | Yadav et al. |
| 2017/0076206 A1 | 3/2017 | Lastras-Montano et al. |
| 2017/0085590 A1 | 3/2017 | Hsu et al. |
| 2017/0118092 A1 | 4/2017 | Dixon et al. |
| 2017/0123886 A1 | 5/2017 | Vaideeswaran |
| 2017/0126709 A1* | 5/2017 | Baradaran ........... H04L 63/1416 |
| 2017/0270105 A1 | 9/2017 | Ninan et al. |
| 2017/0279838 A1 | 9/2017 | Dasgupta et al. |
| 2017/0288974 A1 | 10/2017 | Yoshihira et al. |
| 2017/0289168 A1 | 10/2017 | Bar et al. |
| 2017/0289847 A1 | 10/2017 | Wetterwald et al. |
| 2017/0310703 A1 | 10/2017 | Ackerman et al. |
| 2017/0353477 A1 | 12/2017 | Faigon |
| 2018/0084011 A1 | 3/2018 | Joseph et al. |
| 2018/0109507 A1 | 4/2018 | Caldera et al. |
| 2018/0109557 A1 | 4/2018 | Yoo et al. |
| 2018/0131675 A1 | 5/2018 | Sengupta et al. |
| 2018/0139227 A1 | 5/2018 | Martin et al. |
| 2018/0167310 A1 | 6/2018 | Kamble |
| 2018/0191755 A1* | 7/2018 | Monaco ............. H04L 63/1425 |
| 2018/0198812 A1* | 7/2018 | Christodorescu ... H04L 63/1425 |
| 2018/0219879 A1* | 8/2018 | Pierce ................. H04L 63/1416 |
| 2018/0260715 A1 | 9/2018 | Yan et al. |
| 2019/0007283 A1 | 1/2019 | Kieviet et al. |
| 2019/0012441 A1 | 1/2019 | Tuli et al. |
| 2019/0028357 A1 | 1/2019 | Kokkula et al. |
| 2019/0102469 A1 | 4/2019 | Makovsky et al. |
| 2019/0121979 A1 | 4/2019 | Chari et al. |
| 2019/0171725 A1 | 6/2019 | Shen et al. |
| 2019/0196912 A1 | 6/2019 | Didehban et al. |
| 2019/0245763 A1 | 8/2019 | Wu et al. |
| 2019/0266999 A1 | 8/2019 | Chandrasekaran et al. |
| 2019/0303198 A1 | 10/2019 | Kim et al. |

OTHER PUBLICATIONS

Official Communication for U.S. Appl. No. 12/326,672 dated Dec. 23, 2010.

Official Communication for U.S. Appl. No. 12/326,672 dated Jun. 22, 2011.

Official Communication for U.S. Appl. No. 12/326,672 dated Oct. 24, 2011.

(56) References Cited

OTHER PUBLICATIONS

U.S. Appl. No. 11/683,643, entitled "Detecting Anomalous Network Application Behavior", by Jesse Abraham Rothstein and Arindum Mukerji, filed Mar. 8, 2007.
U.S. Appl. No. 11/679,356, entitled "Capture and Resumption of Network Application Sessions", by Jesse Abraham Rothstein and Arindum Mukerji, filed Feb. 27, 2007.
Official Communication for U.S. Appl. No. 11/683,643 dated Apr. 28, 2010.
Official Communication for U.S. Appl. No. 11/683,643 dated Oct. 14, 2010.
Official Communication for U.S. Appl. No. 11/683,643 dated Aug. 25, 2011.
Official Communication for U.S. Appl. No. 11/683,643 dated Jan. 23, 2012.
Official Communication for U.S. Appl. No. 13/831,626 dated Sep. 3, 2013.
Official Communication for U.S. Appl. No. 13/831,673 dated Sep. 30, 2013.
Official Communication for U.S. Appl. No. 13/831,673 dated Mar. 6, 2014.
Official Communication for U.S. Appl. No. 13/831,673 dated May 22, 2014.
Official Communication for U.S. Appl. No. 14/518,996 dated Nov. 20, 2014.
Official Communication for U.S. Appl. No. 13/831,908 dated Jun. 25, 2014.
Official Communication for U.S. Appl. No. 14/500,893 dated Nov. 20, 2014.
Official Communication for U.S. Appl. No. 13/831,908 dated Apr. 9, 2014.
Official Communication for U.S. Appl. No. 13/831,908 dated Aug. 9, 2013.
Official Communication for U.S. Appl. No. 13/831,908 dated Jan. 13, 2014.
Official Communication for U.S. Appl. No. 14/107,631 dated Dec. 30, 2014.
Official Communication for U.S. Appl. No. 14/107,631 dated Feb. 20, 2014.
Official Communication for U.S. Appl. No. 14/107,631 dated Sep. 26, 2014.
Official Communication for U.S. Appl. No. 14/500,893 dated Feb. 18, 2015.
Official Communication for U.S. Appl. No. 14/107,580 dated Mar. 6, 2014.
Official Communication for U.S. Appl. No. 14/107,580 dated Sep. 15, 2014.
Official Communication for U.S. Appl. No. 14/107,580 dated Mar. 17, 2015.
Official Communication for U.S. Appl. No. 11/679,356 dated Jun. 22, 2009.
Official Communication for U.S. Appl. No. 11/679,356 dated Dec. 11, 2009.
Official Communication for U.S. Appl. No. 11/679,356 dated Feb. 22, 2010.
Official Communication for U.S. Appl. No. 11/679,356 dated Sep. 9, 2010.
Official Communication for U.S. Appl. No. 11/679,356 dated Mar. 4, 2011.
Official Communication for U.S. Appl. No. 15/014,932 dated Jun. 10, 2016.
Official Communication for U.S. Appl. No. 15/207,213 dated Jun. 1, 2017.
Official Communication for U.S. Appl. No. 15/207,213 dated May 8, 2017.
Official Communication for U.S. Appl. No. 15/207,213 dated Feb. 23, 2017.
Official Communication for U.S. Appl. No. 15/207,213 dated Oct. 25, 2016.
Official Communication for U.S. Appl. No. 15/014,932 dated Aug. 1, 2017.
Official Communication for U.S. Appl. No. 15/690,135 dated Jan. 18, 2018.
Office Communication for U.S. Appl. No. 15/892,327 dated Apr. 23, 2018.
Office Communication for U.S. Appl. No. 15/891,311 dated Apr. 23, 2018.
Office Communication for U.S. Appl. No. 15/014,932 dated May 15, 2018.
Office Communication for U.S. Appl. No. 15/891,273 dated Jun. 19, 2018.
Office Communication for U.S. Appl. No. 15/014,932 dated Jul. 16, 2018.
Office Communication for U.S. Appl. No. 15/690,135 dated May 22, 2018.
Office Communication for U.S. Appl. No. 15/984,197 dated Aug. 31, 2018.
Official Communication for U.S. Appl. No. 16/048,939 dated Sep. 19, 2018.
Official Communication for U.S. Appl. No. 15/891,311 dated Sep. 24, 2018.
Official Communication for U.S. Appl. No. 16/112,442 dated Nov. 6, 2018.
Official Communication for U.S. Appl. No. 15/891,273 dated Jan. 15, 2019, pp. 1-35.
Official Communication for U.S. Appl. No. 15/891,311 dated Jan. 29, 2019, pp. 1-8.
Official Communication for U.S. Appl. No. 16/174,051 dated Jan. 29, 2019, pp. 1-83.
Official Communication for U.S. Appl. No. 15/014,932 dated Nov. 23, 2018, pp. 1-22.
Official Communication for U.S. Appl. No. 16/100,116 dated Nov. 15, 2018, pp. 1-44.
Official Communication for U.S. Appl. No. 12/326,672 dated Jun. 9, 2010, pp. 1-9.
Official Communication for U.S. Appl. No. 12/326,672 dated Dec. 23, 2010, pp. 1-15.
Official Communication for U.S. Appl. No. 12/326,672 dated Jun. 22, 2011, pp. 1-16.
Official Communication for U.S. Appl. No. 12/326,672 dated Oct. 24, 2011, pp. 1-9.
Lin, Mark, "An Overview of Session Hijacking at the Network and Application Levels," Jan. 18, 2005, pp. 1-16.
U.S. Appl. No. 11/683,643, entitled "Detecting Anomalous Network Application Behavior", by Jesse Rothstein and Arindum Mukerji, filed Mar. 8, 2007, pp. 1-40.
U.S. Appl. No. 11/679,356, entitled "Capture and Resumption of Network Application Sessions", by Jesse Abraham Rothstein and Arindum Mukerji, filed Feb. 27, 2007, pp. 1-37.
Official Communication for U.S. Appl. No. 11/683,643 dated Apr. 28, 2010, pp. 1-35.
Official Communication for U.S. Appl. No. 11/683,643 dated Oct. 14, 2010, pp. 1-43.
Official Communication for U.S. Appl. No. 11/683,643 dated Aug. 25, 2011, pp. 1-43.
Official Communication for U.S. Appl. No. 11/683,643 dated Jan. 23, 2012, pp. 1-6.
Official Communication for U.S. Appl. No. 13/831,626, dated Sep. 3, 2013, pp. 1-17.
Official Communication for U.S. Appl. No. 13/831,673 dated Sep. 30, 2013, pp. 1-10.
Official Communication for U.S. Appl. No. 13/831,673 dated Mar. 6, 2014, pp. 1-12.
Official Communication for U.S. Appl. No. 13/831,673 dated May 22, 2014, pp. 1-5.
Official Communication for U.S. Appl. No. 14/518,996 dated Nov. 20, 2014, pp. 1-41.
Official Communication for U.S. Appl. No. 13/831,908 dated Jun. 25, 2014, pp. 1-15.
Official Communication for U.S. Appl. No. 14/500,893 dated Nov. 20, 2014, pp. 1-15.

(56) References Cited

OTHER PUBLICATIONS

Official Communication for U.S. Appl. No. 13/831,908 dated Apr. 9, 2014, pp. 1-3.
Official Communication for U.S. Appl. No. 13/831,908 dated Aug. 9, 2013, pp. 1-29.
Official Communication for U.S. Appl. No. 13/831,908 dated Jan. 13, 2014, pp. 1-31.
Official Communication for U.S. Appl. No. 14/107,631 dated Dec. 30, 2014, pp. 1-12.
Handel et al. "Hiding Data in the OSI Network Model," Los Alamos, New Mexico, 1996, pp. 1-16.
Official Communication for U.S. Appl. No. 14/107,631 dated Feb. 20, 2014, pp. 1-16.
Official Communication for U.S. Appl. No. 14/107,631 dated Sep. 26, 2014, pp. 1-14.
Handley et al., "Network Intrusion Detection: Evasion, Traffic Normalization, and End-to-End Protocol Semantics," 2011, International Computer Science Institute, pp. 1-17.
Information Sciences Institute, "Internet Protocol Darpa Internet Program Protocol Specification," Sep. 1981, pp. 1-36.
Fuertes, "Evaluation of OSPF Extensions in MANET Routing," Paris, 2007, pp. 1-192.
Parsons, "Moving Across the Internet: Code-Bodies, Code-Corpses, and Network Architecture," May 9, 2010, pp. 1-20.
Zander et al., "Covert Channels and Countermeasures in Computer Network Protocols," Dec. 2007, pp. 1-7.
Official Communication for U.S. Appl. No. 14/500,893 dated Feb. 18, 2015, pp. 1-11.
Official Communication for U.S. Appl. No. 14/107,580 dated Mar. 6, 2014, pp. 1-13.
Official Communication for U.S. Appl. No. 14/107,580 dated Sep. 15, 2014, pp. 1-15.
Official Communication for U.S. Appl. No. 14/107,580 dated Mar. 17, 2015, pp. 1-5.
Official Communication for U.S. Appl. No. 11/679,356 dated Jun. 22, 2009, pp. 1-21.
Official Communication for U.S. Appl. No. 11/679,356 dated Dec. 11, 2009, pp. 1-23.
Official Communication for U.S. Appl. No. 11/679,356 dated Feb. 22, 2010, pp. 1-3.
Official Communication for U.S. Appl. No. 11/679,356 dated Sep. 9, 2010, pp. 1-16.
Official Communication for U.S. Appl. No. 11/679,356 dated Mar. 4, 2011, pp. 1-15.
Official Communication for U.S. Appl. No. 15/014,932 dated Jun. 10, 2016, pp. 1-20.
Official Communication for U.S. Appl. No. 15/014,932 dated Dec. 14, 2016, pp. 1-26.
Digital Imaging and Communications in Medicine (DICOM), Part 6: Data Dictionary, PS 3.6.-2011. 2011, http://dicom.nema.org/Dicom/2011/11_06pu.pdf, pp. 1-255.
Health Level Seven, Version 2.6, Appendix A. Nov. 2007, https://www.hl7.org/special/committees/vocab/V26_Appendix_A.pdf, p. 1-216.
Official Communication for U.S. Appl. No. 15/207,213 dated Jun. 1, 2017, pp. 1-24.
Official Communication for U.S. Appl. No. 15/207,213 dated May 8, 2017, pp. 1-5.
Official Communication for U.S. Appl. No. 15/207,213 dated Feb. 23, 2017, pp. 1-24.
Official Communication for U.S. Appl. No. 15/207,213 dated Oct. 25, 2016, pp. 1-18.
Official Communication for U.S. Appl. No. 15/014,932 dated Aug. 1, 2017, pp. 1-27.
Official Communication for U.S. Appl. No. 15/690,135 dated Jan. 18, 2018, pp. 1-6.
Office Communication for U.S. Appl. No. 15/892,327 dated Apr. 23, 2018, pp. 1-35.
Office Communication for U.S. Appl. No. 15/014,932 dated May 15, 2018, pp. 1-27.
Office Communication for U.S. Appl. No. 15/891,273 dated Jun. 19, 2018, pp. 1-23.
Office Communication for U.S. Appl. No. 15/014,932 dated Jul. 16, 2018, pp. 1-16.
Office Communication for U.S. Appl. No. 15/690,135 dated May 22, 2018, pp. 1-7.
Office Communication for U.S. Appl. No. 15/984,197 dated Aug. 31, 2018, pp. 1-60.
Official Communication for U.S. Appl. No. 16/048,939 dated Sep. 19, 2018, pp. 1-36.
Official Communication for U.S. Appl. No. 15/891,311 dated Sep. 24, 2018, pp. 1-16.
Official Communication for U.S. Appl. No. 16/112,442 dated Nov. 6, 2018, pp. 1-44.
Official Communication for U.S. Appl. No. 15/671,060 dated May 8, 2019, pp. 1-18.
Official Communication for U.S. Appl. No. 16/113,422 dated Jun. 5, 2019, pp. 1-7.
Official Communication for U.S. Appl. No. 15/891,273 dated May 28, 2019, pp. 1-14.
Official Communication for U.S. Appl. No. 15/671,060 dated May 8, 2019.
Official Communication for U.S. Appl. No. 16/113,422 dated Jun. 5, 2019.
Official Communication for U.S. Appl. No. 15/891,273 dated May 28, 2019.
Official Communication for U.S. Appl. No. 16/048,939 dated Dec. 5, 2019, pp. 1-60.
Official Communication for U.S. Appl. No. 16/565,109 dated Nov. 27, 2019, pp. 1-31.
Official Communication for U.S. Appl. No. 16/525,290 dated Oct. 31, 2019, pp. 1-17.
Official Communication for U.S. Appl. No. 16/532,275 dated Oct. 24, 2019, pp. 1-42.
Official Communication for U.S. Appl. No. 16/560,886 dated Dec. 6, 2019, pp. 1-45.
Official Communication for U.S. Appl. No. 16/384,574 dated Oct. 8, 2019, pp. 1-60.
Official Communication for U.S. Appl. No. 16/048,939 dated Jun. 20, 2019, pp. 1-14.
Official Communication for U.S. Appl. No. 16/100,116 dated May 30, 2019, pp. 1-23.
Official Communication for U.S. Appl. No. 16/384,574 dated May 31, 2019, pp. 1-44.
Official Communication for U.S. Appl. No. 16/543,243 dated Sep. 27, 2019, pp. 1-45.

* cited by examiner

MANAGING INCIDENT RESPONSE OPERATIONS BASED ON MONITORED NETWORK ACTIVITY

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

In complex networks, network activity, investigating performance or activity anomalies may difficult given the complexity and size of contemporary networks. This may result in incident analysts performing ad-hoc actions to resolve or investigate anomalies in the network. Also, in some cases, organizations may provide workflows or playbooks that to help analysts leverage past investigations. However, ensuring the these workflows or playbooks are followed may be difficult. Also, in some cases, it may be difficult for an organization to track which investigation workflows or playbooks may be effective. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
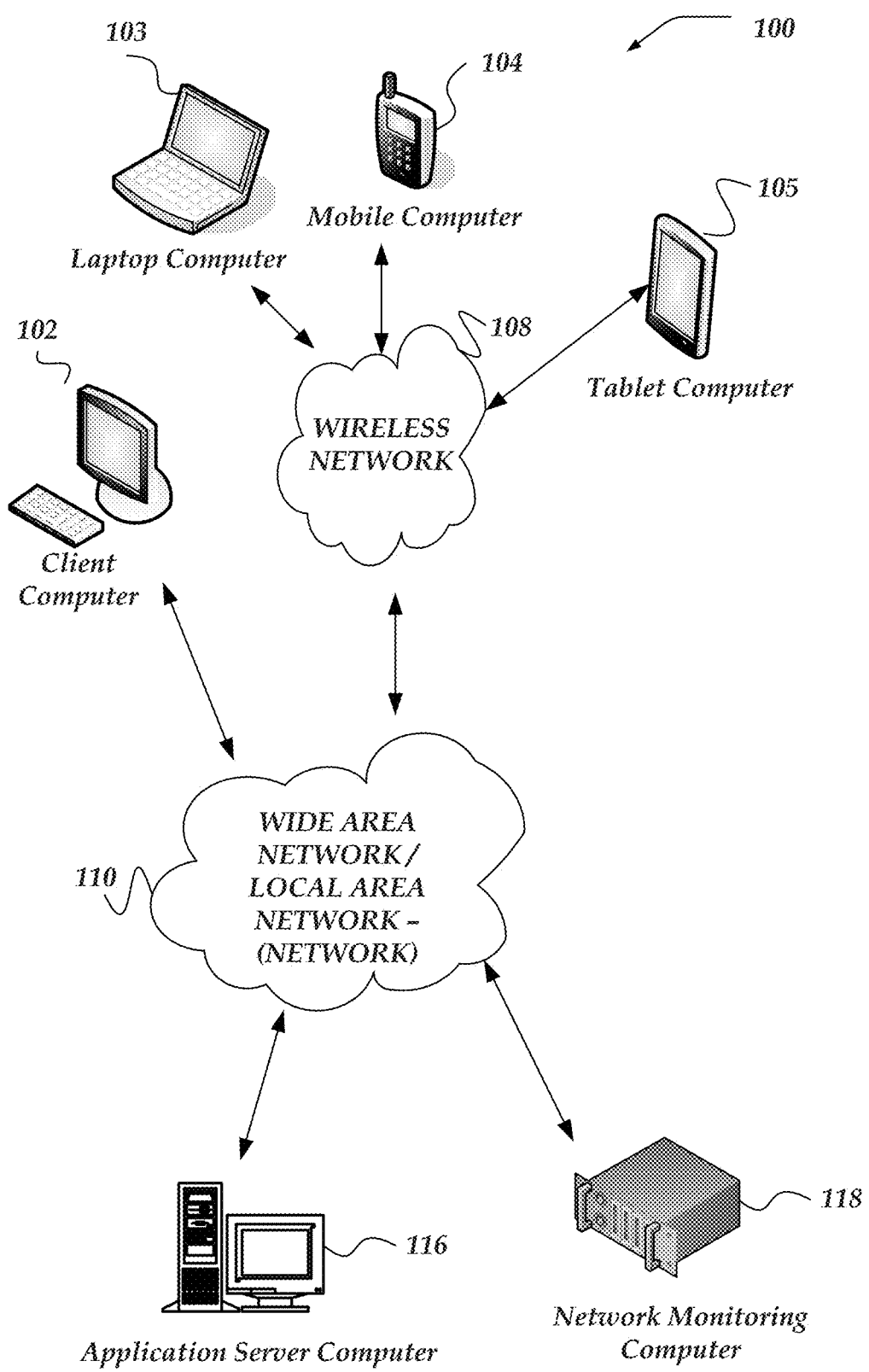
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiment, the NMC may passively monitor network packet traffic without participating in the communication protocols. This monitoring may be performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In one or more of the various embodiments, NMCs or NMC functionality may be implemented using hardware or software based proxy devices that may be arranged to intercept network traffic in the monitored networks.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein the term "metric" refers to a value that represents one or more performance characteristics of a monitored network. Metrics may include aggregated measurements, rate of changes, proportions, or the like, Metrics may be associated with particular network application, network protocols, entities, or the like. Metrics may include an indication of the presence of one or more patterns, such as, network packet headers, protocol preambles, or the like. Common metrics may include: requests and responses for Hypertext Transfer Protocol) HTTP; database protocols; Transport Security Layer/Secure Sockets Layer (TLS/SSL); storage protocols, such as, Common Internet File System (CIFS) or Network File System (NFS), Domain Name Service (DNS), Lightweight Directory Access Protocol (LDAP); NoSQL storage protocols such as MongoDB or Memcache, File Transfer Protocol (FTP), Simple Mail Transfer Protocol (SMTP); and Voice-over-IP (VoIP) protocols such as Session Initiation Protocol (SIP) and Real-time Transport Protocol (RTP); or the like. Within each of metric, there may be measurements broken down by Response Status Codes (that may apply across many protocols, including HTTP, SMTP, SIP); HTTP Requests by Method (GET, POST, HEAD, or the like); requests by SQL method and table, SSL certificate expiration time by host, various protocols by username (e.g., LDAP, FTP, SMTP, VoIP, or the like), and by client or server IP (almost every protocol). Also, in some embodiments, users may define custom metrics based on the collection of user-defined measurements for a given protocol or entity.

As used herein the "metric visualization," or "visualization" refers to a graphical representation of one or more metrics. A metric may be associated with one or more different types of visualizations. In some embodiments, metric visualizations may be line graphs, pie charts, bar graphs, scatter plots, heat maps, Sankey diagrams, histograms, time series graphs, candlestick charts, geolocation charts, or the like, or combination thereof, displayed in a graphical user interface.

As used herein, the term "entity" refers to an actor or element in a monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "device relation model" refers to a data structure that is used to represent relationships between and among different entities in a monitored network. Device relation models may be graph models comprised of nodes and edges stored in the memory of a network computer. In some embodiments, the network computer may automatically update the configuration and composition of the device relation model stored in the memory of the network computer to reflect the relationships between two or more entities in the monitored network. Nodes of the graph model may represent entities in the network and the edges of the graph model represent the relationship between entities in the network. Device relation models may improve the performance of computers at least by enabling a compact representation of entities and relationships in large networks to reduce memory requirements.

As used herein, the "device profile" refers to a data structure that represents the characteristics of network devices or entities that are discovered in networks monitored by NMCs. Values or fields in device profiles may be based on metrics, network traffic characteristics, network footprints, or the like, that have been collected based on passive network monitoring of network traffic in one or more monitored networks. Device profiles may be provided for various network devices, such as, client computers, server computers, application server computers, networked storage devices, routers, switches, firewalls, virtual machines, cloud instances, or the like.

As used herein, the "application profile" refers to a data structure that represents the characteristics of applications or services that are discovered in networks monitored by NMCs. Values or fields in application profiles may be based on metrics, network traffic characteristics, network footprints, or the like, that have been collected based on passive network monitoring of network traffic in one or more monitored networks. Application profiles may be provided for various applications, such as, client computers, server computers, application server computers, networked storage devices, routers, switches, firewalls, virtual machines, cloud instances, or the like. For example, application profiles may be provided for web clients, web servers, database clients, database servers, credentialing services, mobile application clients, payment processors, groupware clients, groupware services, micro-services, container based services, document management clients, document management services, billing/invoicing systems, building management services, healthcare management services, VOIP clients, VOIP servers, or the like.

As used herein, the term "entity profile" refers to a data structure that represents the characteristics of a network entity that may be a combination of device profiles and application profiles. Entity profiles may also include additional values or fields based on metrics, network traffic characteristics, network footprint, or the like, that have been collected based on passive network monitoring of network traffic in one or more monitored networks. For example, an entity profile may be provided for application servers where the entity profile is made from some or all of the device profile of the computer running or hosting the applications and some or all of the application profiles associated with the applications or services that are running or hosting one the computer. In some cases, multiple services or applications running on devices may be included in the same entity profile. In other cases, entity profiles may be arranged in hierarchal data structure similar to an object oriented computer languages class hierarchy.

As used herein, the term "anomaly profile" refers to a data structure that that represents the characteristics of particular classes, types, or categorizations of anomalies that may be detected in a monitored network. Anomaly profiles may include various features including values or fields based on metrics, network traffic characteristics, activity content/traffic, or the like, that have been collected based on passive network monitoring of network traffic in one or more monitored networks before, during, or after the occurrence of one or more anomalies.

As used herein, the term "investigation profile" refers to a data structure that that represents the characteristics of particular classes, types, or categorizations of activity or actions that were performed to investigate one or more anomalies. This may include activities directed to devices or entities as well as activity generated by devices or entities. Investigation profiles may include additional values or fields based on measurements, metrics, network traffic characteristics, activity content/traffic, or the like, that have been collected based on passive network monitoring of network traffic in one or more monitored networks before, during, or after an investigation of one or more detected anomalies. In some cases, investigation profiles may be associated with one or more anomaly profiles, application profiles or entity profiles. In some embodiments, investigation profiles may include an ordered set of actions or action descriptions that may be presented to guide investigator that may be investigating one or more anomalies. Investigation profiles may include actionable information or instructions that may trigger the display or one or more reports or visualizations that are related to the investigation of a particular anomaly.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

Metrics may include an indication of the presence of one or more patterns, such as, network packet headers, protocol preambles, or the like. Common metrics may include: requests and responses for Hypertext Transfer Protocol) HTTP; database protocols; Transport Security Layer/Secure Sockets Layer (TLS/SSL); storage protocols, such as, Common Internet File System (CIFS) or Network File System (NFS), Domain Name Service (DNS), Lightweight Directory Access Protocol (LDAP); NoSQL storage protocols such as MongoDB or Memcache, File Transfer Protocol (FTP), Simple Mail Transfer Protocol (SMTP); and Voice-over-IP (VoIP) protocols such as Session Initiation Protocol (SIP) and Real-time Transport Protocol (RTP); or the like.

Within each of metric, there may be measurements broken down by Response Status Codes (that may apply across many protocols, including HTTP, SMTP, SIP); HTTP Requests by Method (GET, POST, HEAD, or the like); requests by SQL method and table, SSL certificate expiration time by host, various protocols by username (e.g., LDAP, FTP, SMTP, VoIP, or the like), and by client or server IP (almost every protocol). Also, in some embodiments, users may define "custom" metrics based on the collection of user-defined measurements for a given protocol.

As used herein the "metric visualization" refers to a graphical representation of a metric. A metric may be associated with one or more different types of visualizations. In some embodiments, metrics visualizations may be line graphs, pie charts, bar graphs, scatter plots, heat maps, Sankey diagrams, histograms, time series graphs, candlestick charts, geolocation charts, or the like, or combination thereof, display in a graphical user interface.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring network traffic using one or more network computers. In one or more of the various embodiments, a monitoring engine may be instantiated to perform various actions. In one or more of the various embodiments, the monitoring engine may be arranged to monitor network traffic associated with a plurality of entities in one or more networks to provide one or more metrics. In one or more of the various embodiments, the monitoring engine may be arranged to determine an anomaly based on the one or more metrics exceeding one or more threshold values.

In one or more of the various embodiments, an inference engine may be instantiated to perform actions, such as, providing an anomaly profile from a plurality of anomaly profiles based on one or more portions of the network traffic that are associated with the anomaly. In one or more of the various embodiments, providing the anomaly profile may include: providing one or more features associated with the anomaly based on the one or more portions of the network traffic that are associated with the anomaly; comparing the one or more features to one or more other features that are associated with the plurality of anomaly profiles; and generating the anomaly profile based on a negative result of the comparison, wherein the anomaly profile is generated based on the one or more features.

In one or more of the various embodiments, the inference engine may be arranged to provide an investigation profile from a plurality of investigation profiles based on the anomaly profile such that the investigation profile includes information associated with one or more investigation activities associated with an investigation of the anomaly. In one or more of the various embodiments, providing the investigation profile may include: providing one or more investigation models that are trained to classify anomaly profiles; employing the one or more investigation models to classifying the anomaly profile; and providing the investigation profile based on a classification of the anomaly profile.

In one or more of the various embodiments, the inference engine may be arranged to monitor the investigation of the anomaly based on one or more other portions of the network traffic such that the one or more other portions of the network traffic are associated with monitoring an occurrence of the one or more investigation activities.

In one or more of the various embodiments, the inference engine may be arranged to modify a performance score that may be associated with the investigation profile based on the occurrence of the one or more investigation activities and a completion status of the investigation such that the performance score is decreased when one or more other investigation activities are included in the investigation or when one or more of the one or more investigation activities are omitted from the investigation of the anomaly.

In one or more of the various embodiments, the inference engine may be arranged to: provide network activity information that may be associated with one or more previous occurrences of one or more anomalies; provide investigation activity information that may be associated with previous investigations associated with one or more investigation profiles and the one or more anomalies; and evaluate the one or more investigation profiles based on the investigation activity information associated with previous investigations of the one or more anomalies such that the one or more investigation profiles may be optimized based on the evaluation.

In one or more of the various embodiments, the inference engine may be arranged to: provide network activity information that may be associated with one or more previous occurrences of one or more anomalies; provide investigation activity information and completion results that are associated with previous investigations associated with one or more investigation profiles and the one or more anomalies; train one or more investigation models to provide an investigation profiles based on an input that includes an input anomaly profile, investigation activity information, and completion results; and re-train the one or more investigation models if a confidence score associated with the one or more investigation models is less than a threshold value.

In one or more of the various embodiments, the inference engine may be arranged to: provide a playbook that defines one or more actions for investigating the anomaly; compare the occurrence of the one or more investigation activities with the one or more actions defined in the playbook to provide a deviation score, such that the deviation score is associated with a number of the one or more actions that are not performed during the investigation; and evaluate an efficacy of the playbook based on the deviation score and the completion result associated with the investigation.

In one or more of the various embodiments, the inference engine may be arranged to generate the investigation profile based on the one or more other portions of the network traffic that are associated with the one or more investigation activities.

In one or more of the various embodiments, the inference engine may be arranged to provide one or more reports based on the investigation and the completion result such that the one or more reports are displayed to one or more users.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features.

Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiment, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
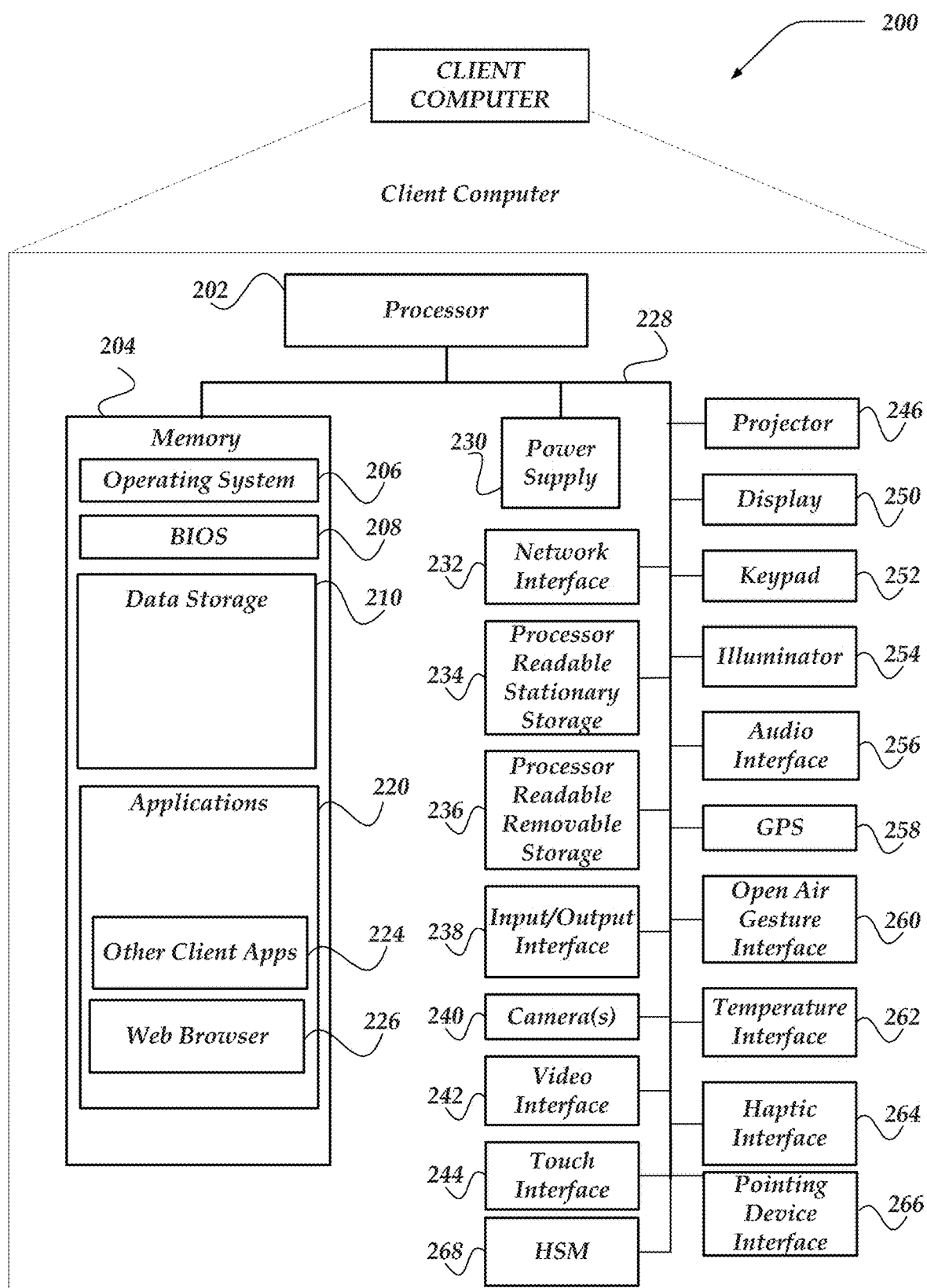
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX', or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
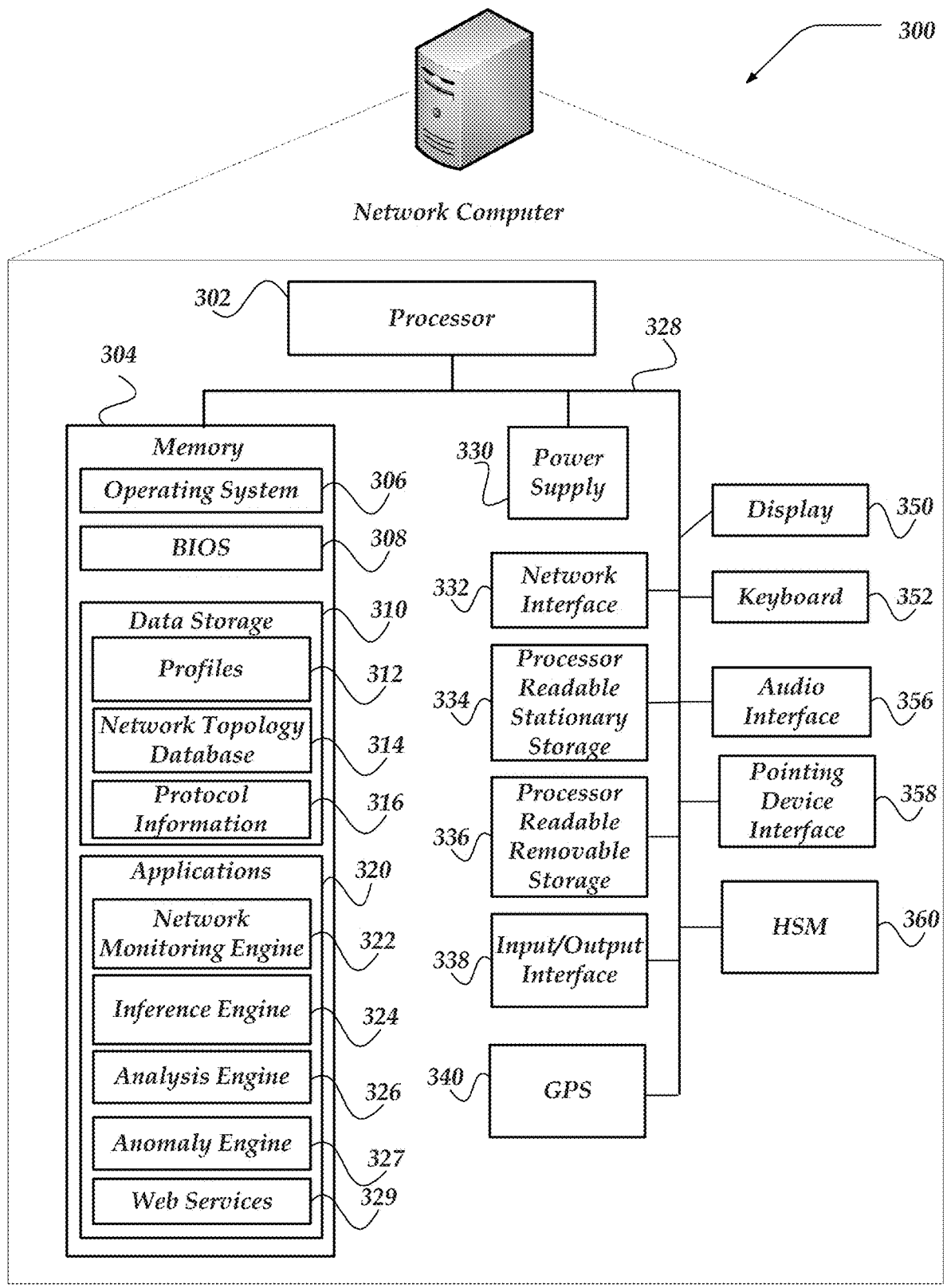
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, inference engine 324, analysis engine 326, anomaly engine 327, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, reports, as well as internal processes or databases. In at least one of the various embodiments, geo-location information used for selecting localization information may be provided by GPS 340. Also, in some embodiments, geolocation information may include information provided using one or more geo-location protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, profiles 312, network topology database 314, protocol information 316, or the like. profiles 312 may be a database arranged for storing the various profiles that are associated with network activity, entities, anomalies, or the like, including entity profiles, device profiles, application profiles, anomaly profiles, investigation profiles, or the like, that may occur in monitored networks. Network topology database 314 may be a data store that contains information related to the topology of one or more network monitored by a NMC, including one or more device relation models. And, protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity discovery, anomaly detection, or the like, in a monitored network environment.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, inference engine 324, analysis engine 326, anomaly engine 327, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, inference engine 324, analysis engine 326, anomaly engine 327, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, inference engine 324, analysis engine 326, anomaly engine 327, web services 329, or the like, may be provisioned and de-commissioned automatically.

Also, in one or more of the various embodiments, network monitoring engine 322, inference engine 324, analysis engine 326, anomaly engine 327, web services 329, or the like, may be located in virtual servers running in a cloud-based computing environment rather than being tied to one or more specific physical network computers. Likewise, in some embodiments, one or more of network monitoring engine 322, inference engine 324, analysis engine 326, anomaly engine 327, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
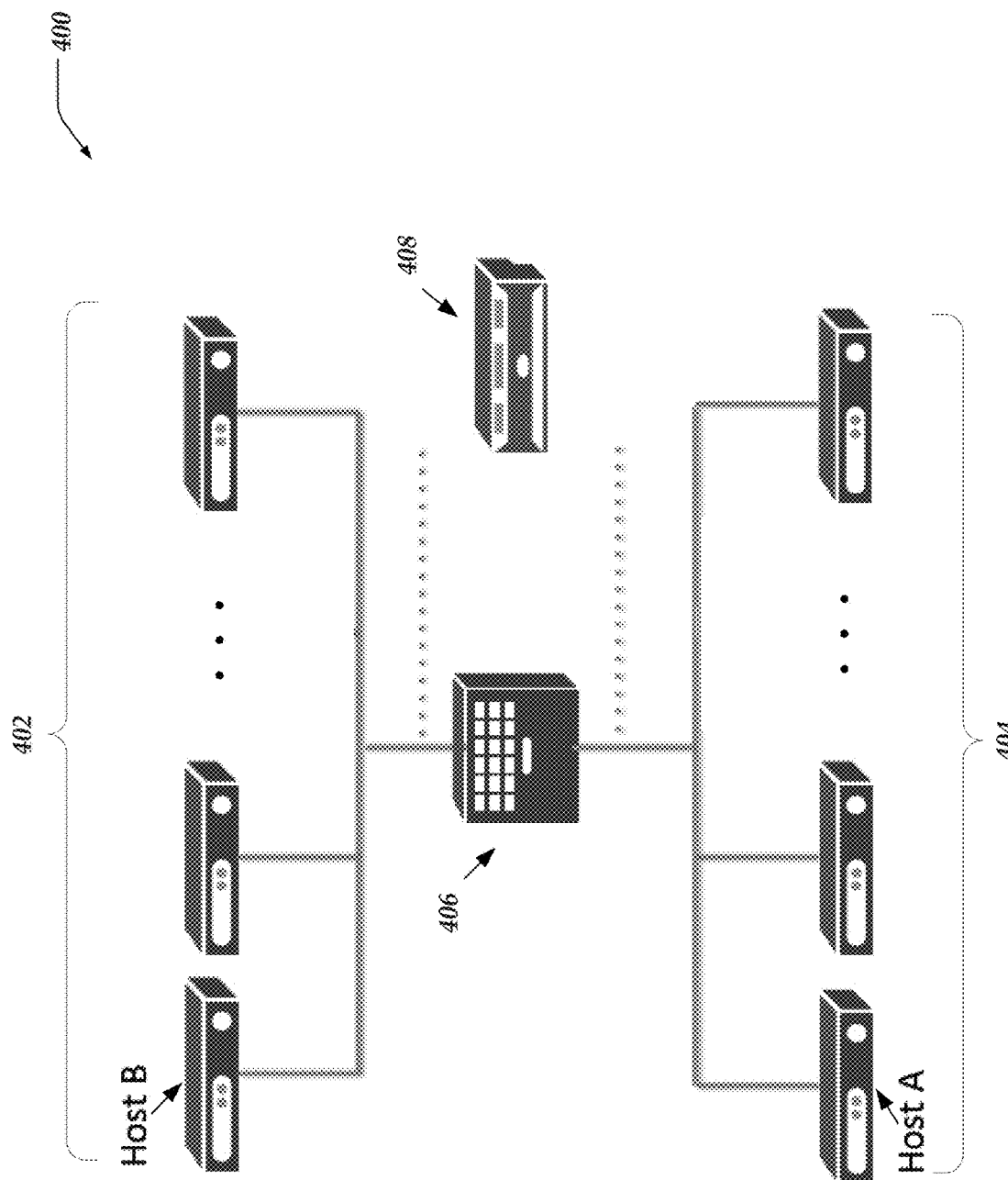
FIG. 4 illustrates a logical architecture of a system for managing incident response operations based on network activity in accordance with one or more of the various embodiments.

FIG. 4 illustrates a logical architecture of system 400 for managing incident response operations based on network activity in accordance with one or more of the various embodiments. System 400 may be arranged to include a plurality of network devices or network computers on first network 402 and a plurality of network devices or network computers on second network 404. Communication between the first network and the second network is managed by switch 406. Also, NMC 408 may be arranged to passively monitor or record packets (network packets) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

In one or more of the various embodiments, NMCs may be arranged to employ adaptive networking monitoring information including one or more device relation models that enable inference engines or analysis engines to monitor or record actions associated with investigating anomalies that may be detected in the monitored networks. Also, in some embodiments, NMCs may be arranged to instantiate one or more network monitoring engines, one or more inference engines, one or more anomaly engines, or the like, to provide investigation models that may be employed to managing incident response operations based on network activity.

Figure 5:
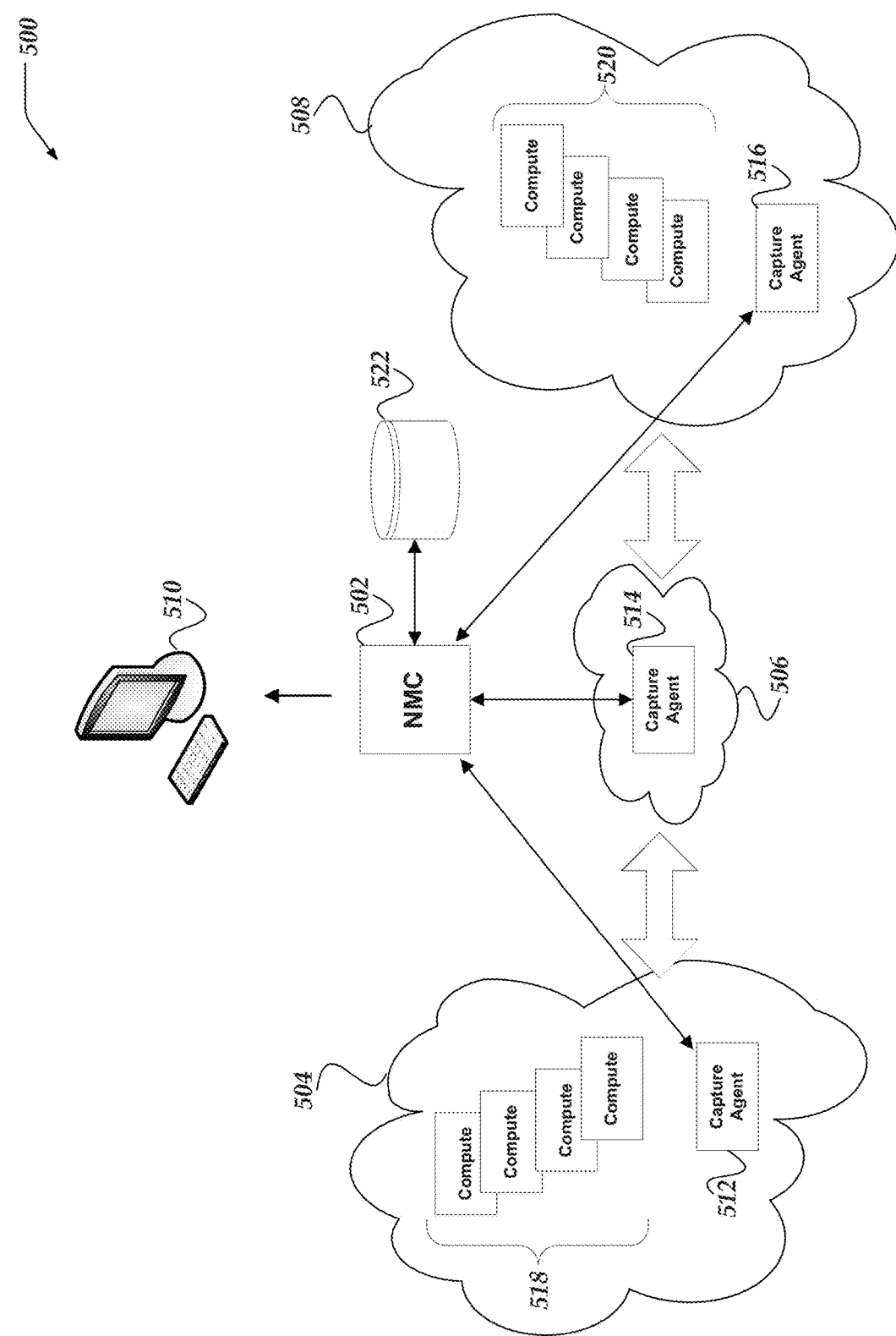
FIG. 5 illustrates a logical schematic of a system for managing incident response operations based on network activity in accordance with one or more of the various embodiments.

FIG. 5 illustrates a logical schematic of system 500 for managing incident response operations based on network activity in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, or the like, or combination thereof.

In one or more of the various embodiments, NMCs, such as NMC 502 may be arranged to communicate with one or more capture agents, such as, capture agent 512, capture agent 514, or capture agent 514. In some embodiments, capture agents may be arranged to selectively capture network traffic or collect network traffic metrics that may be provided to NMC 502 for additional analysis.

In one or more of the various embodiments, capture agents may be NMCs that are distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that may capture metrics for select portions of the monitored networks. Also, in some embodiments, in networks that have groups or clusters of the same or similar entities, capture agents may be selectively installed on one or more entities that may be representative of entire groups or clusters pf similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, applications, services, or the like, subject to network monitoring by one or more NMCs. (See, FIG. 4, as well).

In this example, for one or more of the various embodiments, capture agents, such as capture agent 512 may be arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522.

Figure 6:
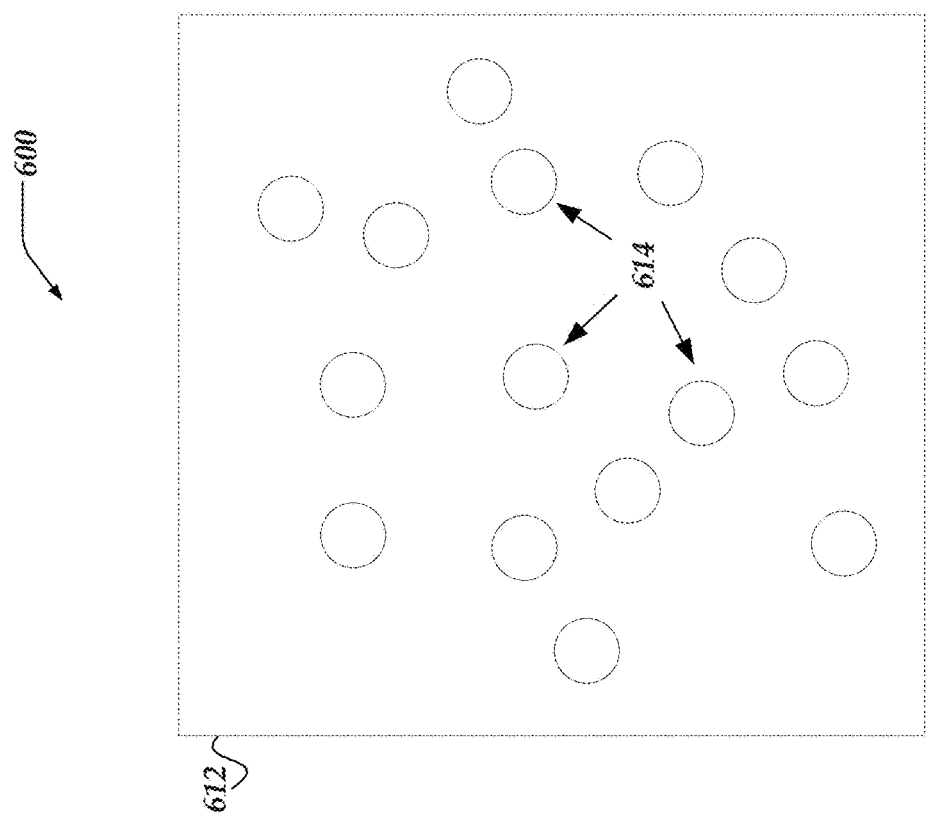
FIG. 6 illustrates a logical representation of a network in accordance with at least one of the various embodiments.
Figure 6:
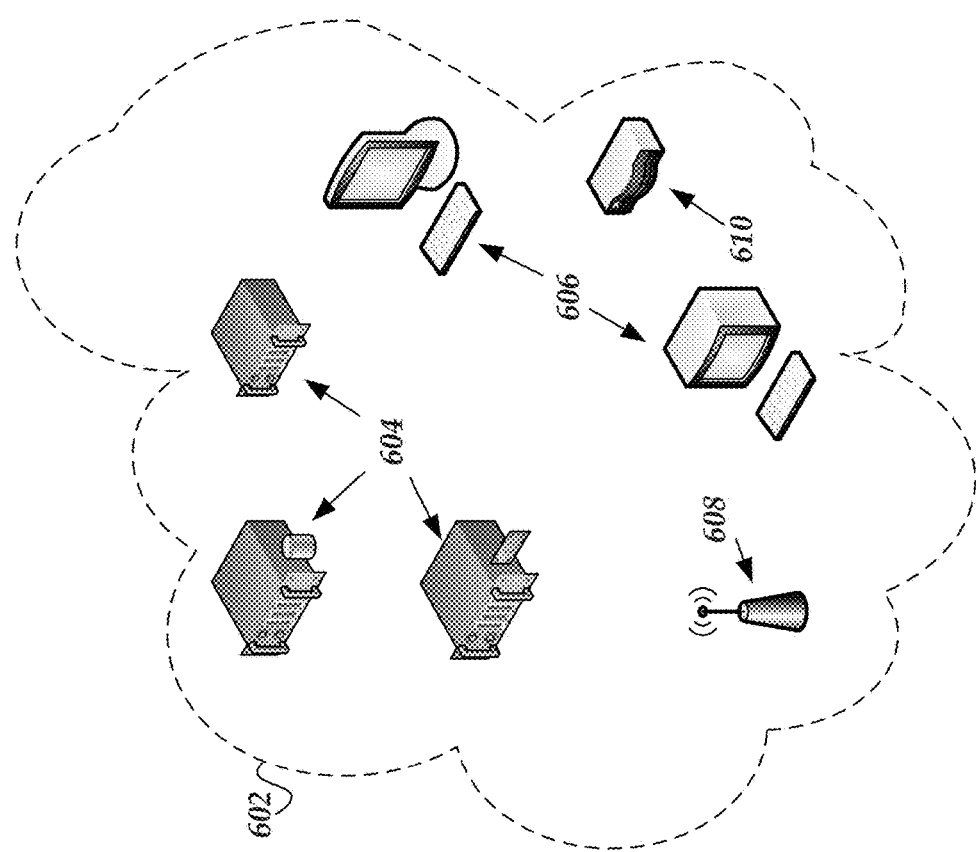

FIG. 6 illustrates a logical representation of network 600 in accordance with at least one of the various embodiments. In at least one of the various embodiments, network 602 represents a physical network and the entities in the network. In this example, network 602 includes, network computers 604, client computers 606, network devices, such as, network device 610, and other items, such as, Wi-Fi hotspot 608. One of ordinary skill in the art will appreciate that networks may have many more or different devices than shown in FIG. 6.

In at least one of the various embodiments, one or more network monitoring computers (NMCs) may be arranged to monitor networks, such as, network 602. (See, FIG. 4). In at least one of the various embodiments, NMCs may be arranged to generate one or more device relation models that represent the entities in a network. For example, device relation model 612 represents a device relation model corresponding to network 602. Accordingly, device relation model 612 includes nodes that represent the various entities that may be active in network 602. For example, entities 614, may represent some of the entities that are operative in network 602. In some embodiments, there may be more entities in model 612 than the number of actual computers and network devices present in network 602 since many network computers/devices may host more than one entity. For example, in some embodiments, a single network computer may host a web server and a database server. Accordingly, in this example, three entities may be included in the device relation model, one for the web server, one for the database server, and one for the network computer itself.

In this example, device relation model 612 shows nodes that correspond to entities absent any edges. In some embodiments, initially some or all of the relationships between the entities may be unknown to the monitoring NMC, so some or all of the edges may be unknown and therefor omitted from device relation model 612. Note, in at least one of the various embodiments, there may be pre-defined network architecture/topology information that may be available to the NMC. Accordingly, in some embodiments, the NMC may be able to determine some of the relationships between entities before observing network traffic.

Figure 7:
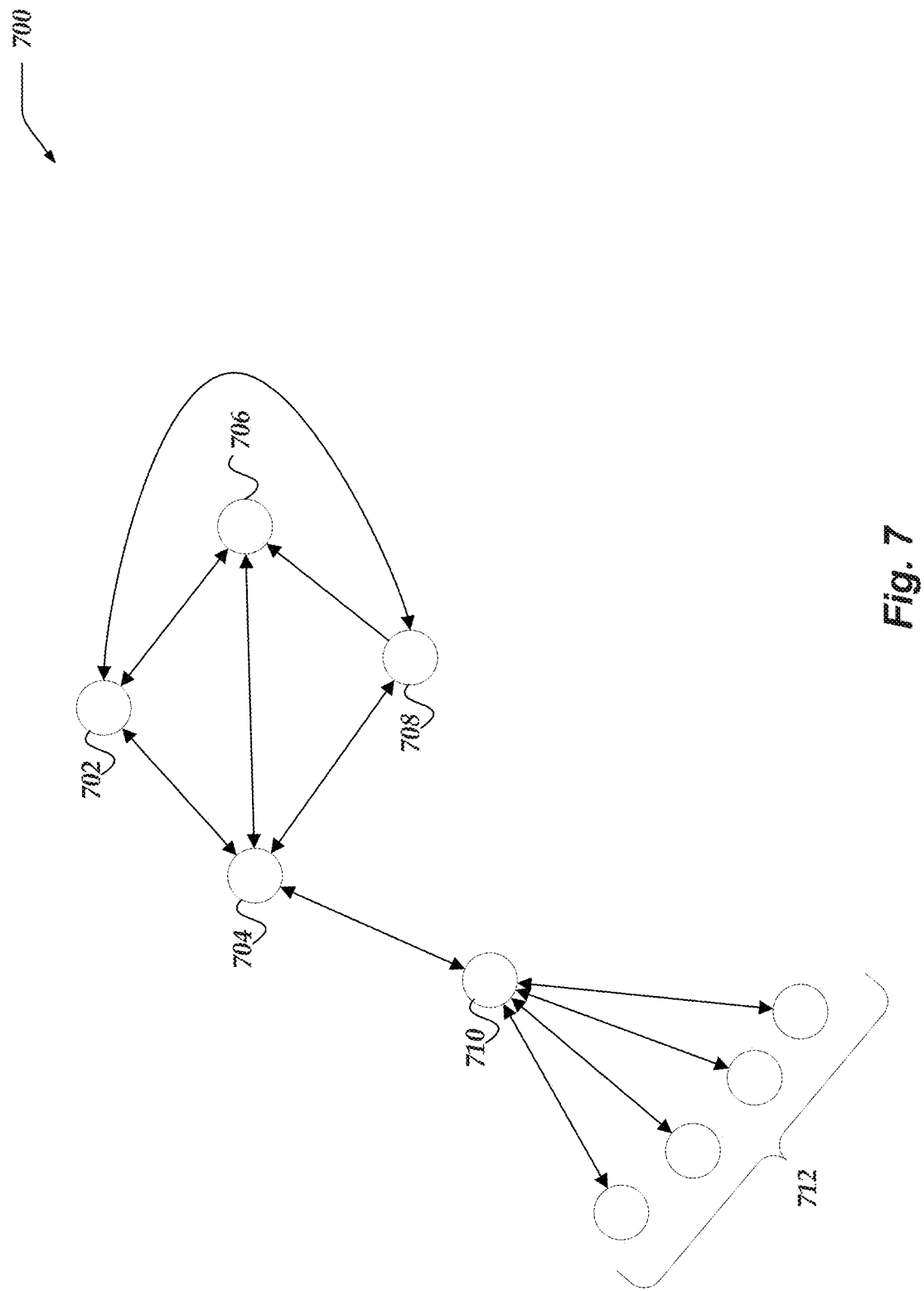
FIG. 7 illustrates a logical representation of a portion of a device relation model in accordance with at least one of the various embodiments.

FIG. 7 illustrates a logical representation of a portion of device relation model 700 in accordance with at least one of the various embodiments. In at least one of the various embodiments, device relation models may include nodes that represent entities and edges that represent relationships between the entities. In some embodiments, entities may represent servers, clients, switches, routers, NMCs, load balancers, applications, services, or the like. For example, entity 702 may be a server entity that has relationships with other servers, such as, entity 704 and entity 706. Likewise, entity 708 may be a server or other service that has a relationship with entity 704, entity 706, and entity 702. Further, entity 704 and entity 710 may have a relationship and client entities 712 may have direct relationships with entity 710.

In at least one of the various embodiments, NMCs may be arranged to use device relation model 700 to discover relationships between groups of entities. For example, device relation model 700 may be used to determine that entity 702, entity 704, 710, and client 712 may be in a related group because they are all on the same path through the graph.

In one or more of the various embodiments, one or more device relation models may be generated to represent different dimensions or concepts that may relate the one or more entities included in a model. For example, one device relation model may represent general dependencies among entities while another device relation model may be arranged to represent administration dependencies that show which entities may be arranged to administer other entities.

Also, in one or more of the various embodiments, one or more device relation models may be arranged to represent various actions one or more anomaly analysts, or the like, may take while conducting an investigation of one or more anomalies. In some embodiments, one or more device relation models may be directed to different networks or sub-networks.

Figure 8B:
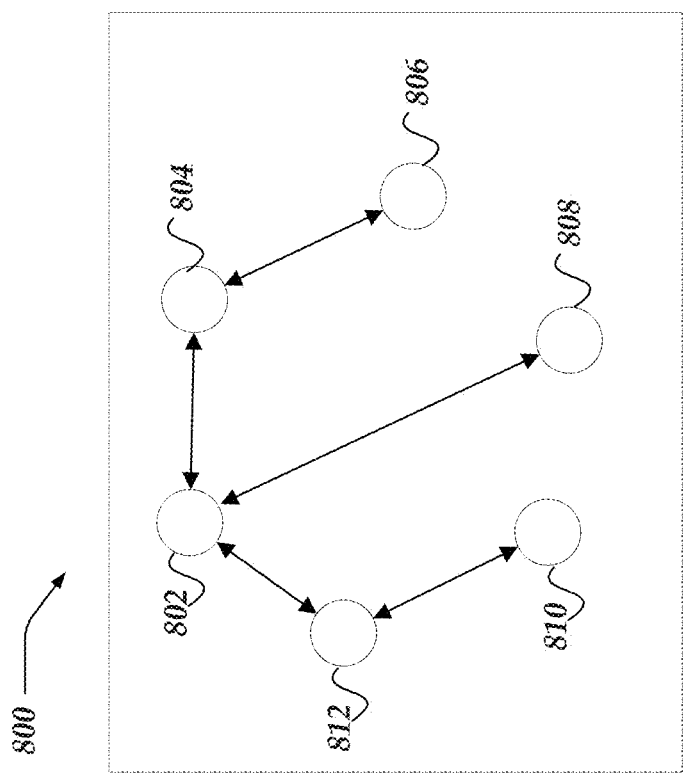
FIG. 8B illustrates a logical representation of a device relation model showing informed relationships between the entities in accordance with the one or more embodiments.
Figure 8A:
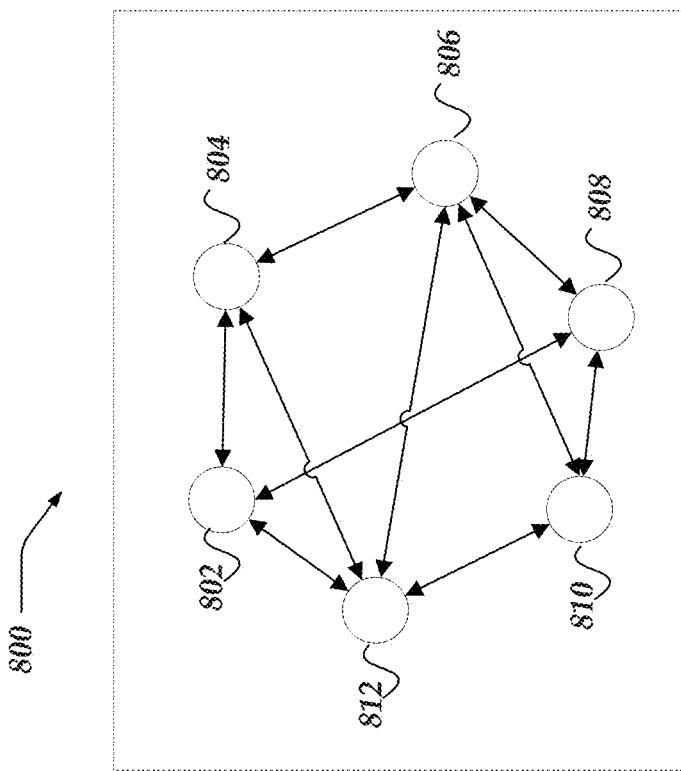
FIG. 8A illustrates a logical representation of a device relation model showing naïve relationships between the entities in accordance with the one or more embodiments.

FIGS. 8A and 8B illustrate how a device relation model may evolve as the NMCs gather more information about the relationships between the entities in a network.

FIG. 8A illustrates a logical representation of device relation model 800 showing naïve relationships between the entities in accordance with the one or more embodiments. In at least one of the various embodiments, for example, a NMC may initially determine the entities in a network by observing the network traffic to obtain the source/destination network address fields in the network packets that flow through the network. In at least one of the various embodiments, each unique network address may represent a different entity in the network.

Likewise, in some embodiments, the NMC may be arranged to observe responses to broadcast messages, or the like. Additionally, in some embodiments, the NMC may be provided other configuration information (e.g., information provided by a configuration management database) that defines some or all of the entities in the network.

In this example, for at least one of the various embodiments, the NMC has discovered/identified six entities in the network (entity 802 through entity 812). Accordingly, in some embodiments, the NMC may be arranged to generate a device relation model, such as, device relation model 800 that represents the six discovered entities as nodes in the graph. Likewise, in some embodiments, edges in device relation model 800 may represent the initial relationships as determined by the NMC. For example, in the initial stages of monitoring a network the NMC may be arranged to determine relationships based on which entities are observed to be communicating with each other.

However, in at least one of the various embodiments, NMCs may be arranged to provide a device relation model that represents the relationships between the entities that go beyond simple interconnectivity. Initially, in some embodiments, the NMC may define the initial relationships in the network based on which entities communicate with each other. However, in at least one of the various embodiments, as the NMC collects more information about the entities and their relationships to other entities, the NMC may modify device relation model 800 to reflect the deeper understanding of these relationships.

FIG. 8B illustrates a logical representation of device relation model 800 showing informed relationships between the entities in accordance with the one or more embodiments. In at least one of the various embodiments, after sufficient monitoring has occurred, the NMC may have observed enough network traffic to evaluate and weight the relationships of the entities in the network.

In at least one of the various embodiments, some of the initial relationships may be determined to be incidental, spurious, or otherwise unimportant. Accordingly, the NMC may be arranged to remove (or de-prioritize) edges from device relation model 800 that correspond to such relationships. For example, in at least one of the various embodiments, entities (e.g., Windows network domain controllers) in a network may be arranged to periodically exchange messages with one or more other entities for discovery/accountability purposes. Thus, in this example, some of the messaging observed by an NMC may be routine and otherwise not resulting from an interesting relationships between the sender and receiver.

In at least one of the various embodiments, NMC may be arranged to evaluate the communication between entities to attempt to determine the type of relationships and the importance of the relationships. Accordingly, in at least one of the various embodiments, NMCs may be arranged to collected metrics associated with the various network flows flowing the network to identify the flows that may be important. Likewise, in at least one of the various embodiments, NMC may be arranged discover and recognize the communication protocols used by entities in monitored networks. In some embodiments, the NMCs may be arranged to use the collected metrics and its understanding of the communication protocol to establish or prioritize relationships between the entities in the networks.

In this example, for at least one of the various embodiments, device relation model 800 has been modified to include relationships determined to be of importance. The nodes representing entities 802-812 are still present in but some of the edges that represent relationships in the network have been removed. For example, in FIG. 8A, device relation model 800 includes an edge between entity 804 and entity 812. In FIG. 8B, device relation model 800 omits the edge between entity 804 and entity 812.

In at least one of the various embodiments, the remaining edges in device relation model 800 represent relationships between the entities that the NMC determined to be important for a given device relation model. Note, in at least one of the various embodiments, an NMC may employ a variety of metrics, conditions, heuristics, or the like, to identify relationships that may be of interest. For example, an NMC may be arranged to identify entities that represent certain applications on the network, such as, database servers, database clients, email servers, email clients, or the like, by identifying the communication protocols that may be used by the particular applications. In other cases, the NMC may determine an important relationship based on the number or rate of packets exchanged between one or more entities. Accordingly, the NMC may be configured to prioritize relationships between entities that exchange a high volume of traffic.

In at least one of the various embodiments, the NMC may analyze observed traffic to identify network packets that flow through particular paths in the device relation model. In some embodiments, NMCs may be arranged to trace or identify such paths connecting related entities by observing common data carried in the payloads or header fields of the network packets that are passed among entities in the network. For example, an NMC may be arranged to observe sequence numbers, session identifiers, HTTP cookies, query values, or the like, from all entities participating in transactions on the network. In some embodiments, the NMC may correlate observed network packets that may be requests and responses based on the contents of the network packets and known information about the operation of the underlying applications or protocols.

Figure 9B:
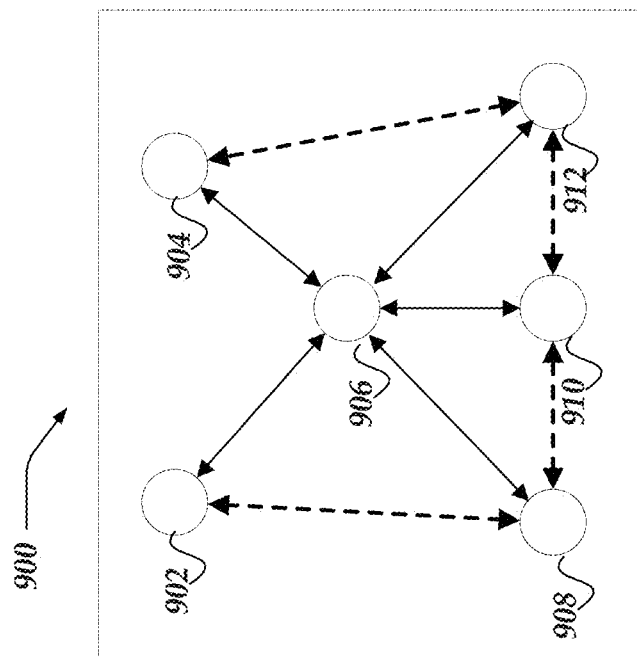
FIG. 9B illustrates a logical representation of a device relation model showing phantom edges that represent relationships between the entities in accordance with the one or more embodiments.
Figure 9A:
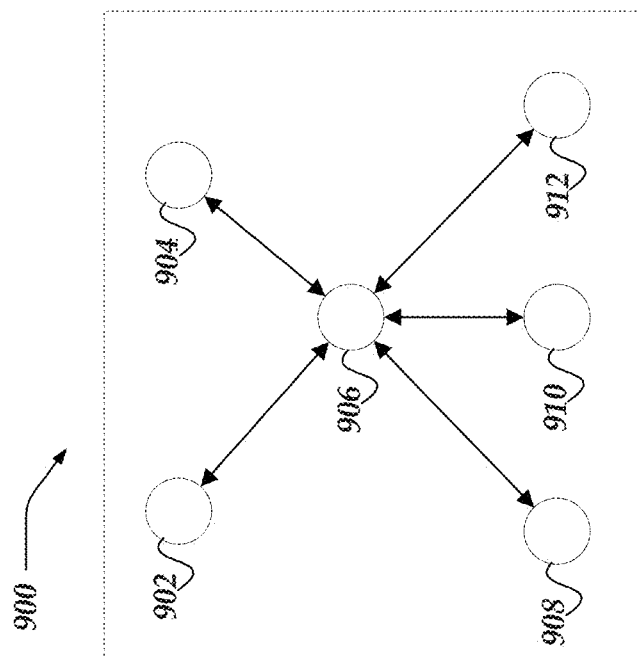
FIG. 9A illustrates a logical representation of a device relation model showing relationships between the entities based on observed network connections in accordance with the one or more embodiments.

FIGS. 9A and 9B provide additional illustration of how a device relation model may evolve as the NMCs gather more information about the relationships between the entities in a network.

FIG. 9A illustrates a logical representation of device relation model 900 showing relationships between the entities based on observed network connections in accordance with the one or more embodiments. In at least one of the various embodiments, the NMC has provided device relation model 900 that represents the relationships between entity 902 through entity 912. Here device relation model 900 shows relationships that may be associated with actual network links (e.g., physical links or virtual links) between the entities in the network. For example, the edges in device relation model 900 may correspond to network flows that have been observed in the network. In some embodiments, an NMC may readily deduce these types of connection relationships by examining the source/destination fields in network packets observed in the network. Accordingly, in this example, entity 906 may have been observed exchanging data with entity 908 over the network.

FIG. 9B illustrates a logical representation of device relation model 900 showing phantom edges that represent relationships between the entities in accordance with the one or more embodiments. In some embodiments, networks may include entities that have important logical/operational relationships even though they do not exchange network packets directly with each other. Here, the NMC has discovered relationships between entity 902 and entity 908 even though they do not communicate directly with each other. Likewise, the NMC has discovered relationships between entity 904 and entity 912 even though they do not communicate directly with each other. Similarly, entity 908, entity 910, entity 912 have been found to be related even though there is no direct network link or direct communication between them.

In at least one of the various embodiments, the NMC may be arranged to represent such relationships using phantom edges. Phantom edges may represent relationships between entities that do not correspond to direct network links. For example, entity 902 and entity 904 may be database clients and entity 908, entity 910, and entity 912 may be database servers. In this example, entity 902 and entity 904 access the database servers through entity 906. In this example, entity 906 may be proxy-based load balancer of some kind. Accordingly, in this example there is no direct network link between the database clients and the database servers. Nor, as represented, do the database server entities (entity 908, entity 910, and entity 912) have direct connections to each other.

But, in some embodiments, the NMC may determine that the three database server entities (entity 908, entity 910, and entity 912) are related because they are each receiving communications from the same load balancer (entity 906). Likewise, the NMC may determine a relationship between the database clients (entity 902 and entity 904) and the database servers (entity 908, entity 910, and entity 912) by observing the operation of the database transactions even though they do not communicate directly with each other.

Figure 10:
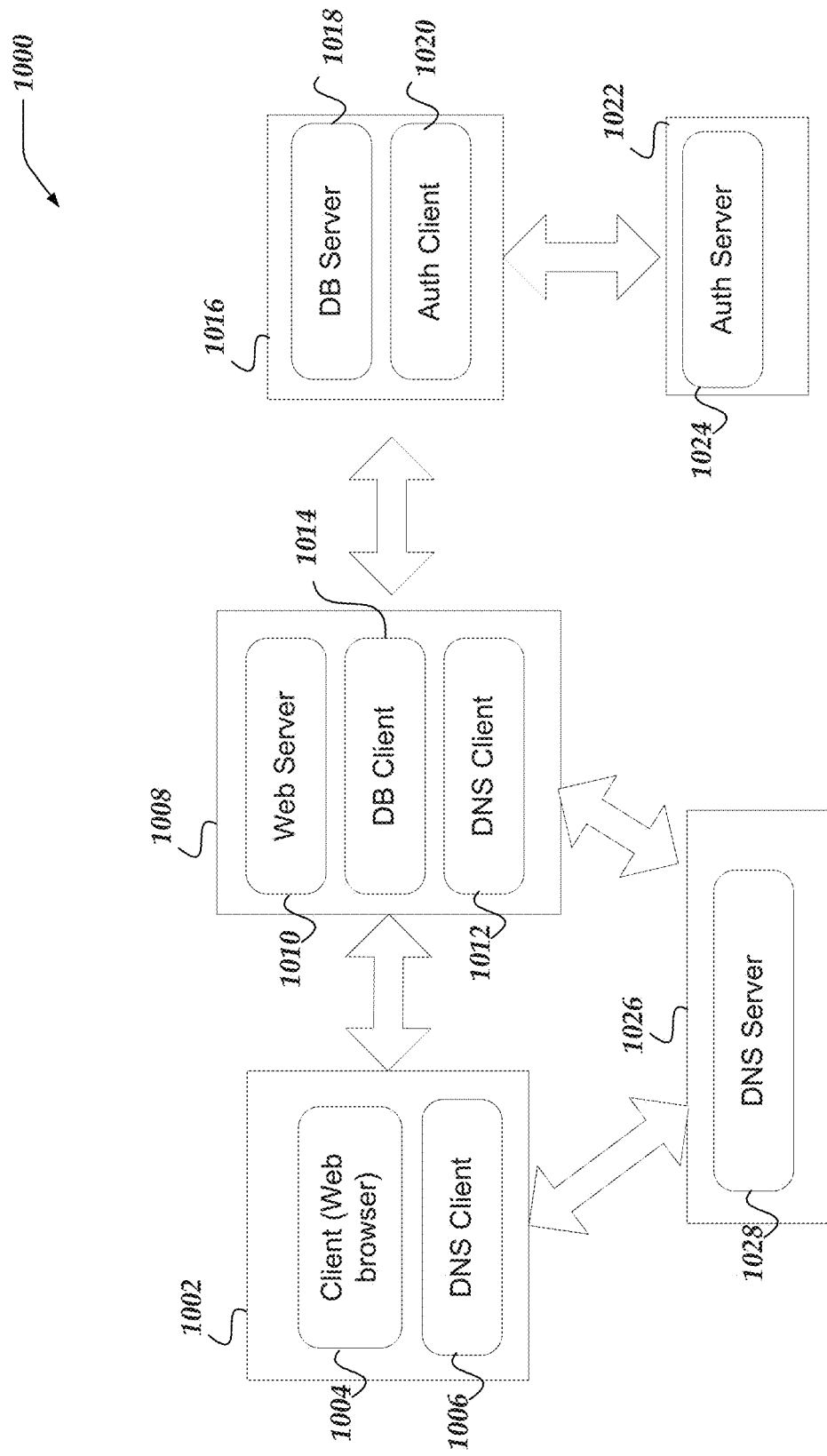
FIG. 10 illustrates a logical architecture of a network that includes entities in accordance with the one or more embodiments.

FIG. 10 illustrates a logical architecture of network 1000 that includes entities in accordance with the one or more embodiments. In at least one of the various embodiments, networks may include several (100s, 1000s, or more) computers or devices that may put network traffic on the network. As described above, (See, FIG. 4 and FIG. 5) network monitoring computers (NMCs) may be arranged to passively monitor the network traffic. In some embodiments, NMCs (not shown in FIG. 10) may have direct access to the wire traffic of the network enabling NMCs to access all of the network traffic in monitored networks.

In at least one of the various embodiments, the NMC may be arranged to identify entities in the network. Entities may include applications, services, programs, processes, network devices, or the like, operating in the monitored network. For example, individual entities may include, web clients, web servers, database clients, database servers, mobile app clients, payment processors, groupware clients, groupware services, or the like. In some cases, multiple entities may co-exist on the same network computer, or cloud compute instance.

In this example, client computer 1002 may be hosting web client 1004 and DNS client 1006. Further, server computer 1008 may be hosting web server 1010, database client 1014, and DNS client 1021. Also, in this example: server computer 1016 may be arranged to host database server 1018 and authorization client 1020; server computer 1022 may be arranged to host authorization server 1024; and server computer 1026 may be arranged to DNS server 1028.

In at least one of the various embodiments, some or all of the applications on a computer may correspond to entities. Generally, applications, services, or the like, that communicate using the network may be identified as entities by an NMC. Accordingly, there may be more than one entity per computer. Some server computers may host many entities. Also, some server computers may be virtualized machine instances executing in a virtualized environment, such as, a cloud-based computing environment. Likewise, one or more servers may running in containerized compute instances, or the like.

In at least one of the various embodiments, an individual process or program running on a network computer may perform more than one type of operation on the network. Accordingly, some processes or programs may be represented as more than one entity. For example, a web server application may have an embedded database client. Thus, in some embodiments, an individual web server application may contribute two or more entities to the device relation model.

In at least one of the various embodiments, the NMC may be arranged to monitor the network traffic to identify the entities and to determine their roles. In at least one of the various embodiments, the NMC may monitor the communication protocols, payloads, ports, source/destination addresses, or the like, or combination thereof, to identify entities.

In at least one of the various embodiments, the NMC may be preloaded with configuration information that it may use to identify entities and the services/roles they may be performing in the network. For example, if an NMC observes a HTTP GET request coming from a computer, it may determine there is a web client entity running on the host. Likewise, if the NMC observes a HTTP 200 OK response originating from a computer it may determine that there is a web server entity in the network.

In at least one of the various embodiments, the NMC may use some or all of the tuple information included in network traffic to distinguish between different entities in the network. Further, the NMC may be arranged to track the connections and network flows established between separate entities by correlating the tuple information of the requests and responses between the entities.

Figure 11:
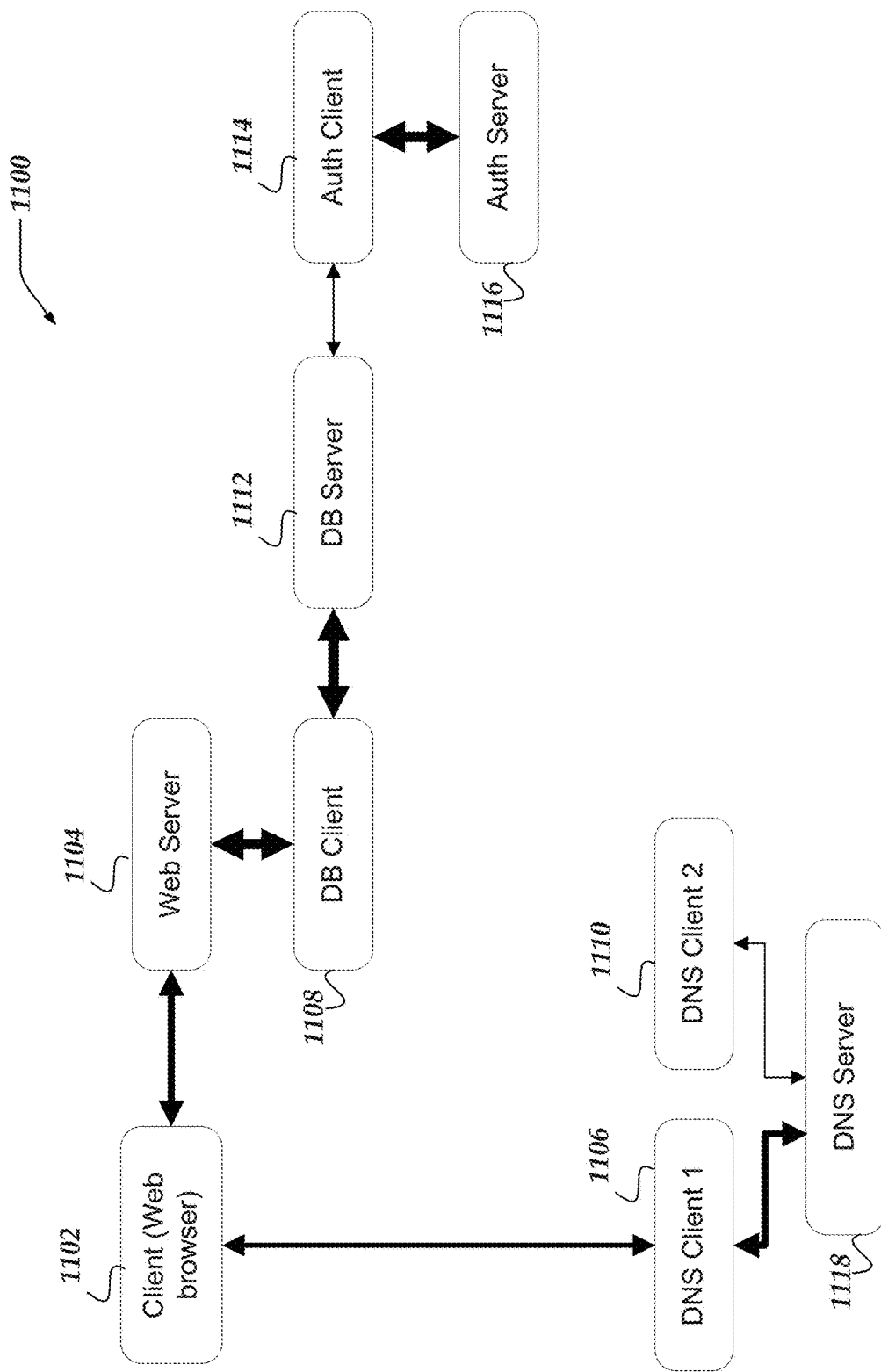
FIG. 11 illustrates a logical representation of a data structure for a device relation model that includes entities in accordance with the one or more embodiments.

FIG. 11 illustrates a logical representation of a data structure for device relation model 1100 that includes entities in accordance with the one or more embodiments. In at least one of the various embodiments, network monitoring computers (NMCs) may be arranged generate device relation models, such as, device relation model 1100. In this example, device relation model 1100 represents the entities discovered network 1000 shown in FIG. 10.

In at least one of the various embodiments, as described above, NMCs may arrange device relation models to represent the relationship the entities have to each other rather than just modeling the network topology. For example, entity 1106, entity 1110, and entity 1118 are each related to the DNS system in network 1000. Therefore, in this example, for some embodiments, the NMC may arrange device relation model 1100 such that all of the DNS related entities (entity 1106, entity 1110, and entity 1118) are neighbors in the graph. Accordingly, in some embodiments, even though entity 1106 corresponds to DNS client 1006 on client computer 1002, the NMC may group entity 1106 with the other DNS entities rather than put it next other entities in the same computer.

In at least one of the various embodiments, the NMC may be arranged to generate device relation model 1100 based on the relationships that the entities have with each other. Accordingly, in some embodiments, the edges in the graph may be selected or prioritized (e.g., weighted) based on the type or strength of the relationship. In at least one of the various embodiments, the metrics used for prioritizing the edges in a device relation model may be selected/computed based on configuration information that includes rules, conditions, pattern matching, scripts, computer readable instructions, or the like. In some embodiments, NMCs may be arranged to apply this configuration information to the observed network packets (e.g., headers, payloads, or the like) to identify and evaluate relationships.

In at least one of the various embodiments, in device relation model 1100, the edge connecting entity 1104 and entity 1108 is depicted thicker to represent the close relationship the web server entity has with the database client entity. This reflects that the web server may be hosting a data centric web application that fetches data from a database when it receives HTTP requests from clients. Likewise, for device relation model 1100 the relationship between the database client (entity 1108) and the database server (entity 1112) is also a strong relationship. Similarly, the relationship between the authorization client (entity 1114) and the authorization server (entity 1116) is a strong relationship.

Also, in this example, the client (entity 1102) and DNS client 1 (entity 1106) have a strong relationship and it follows that DNS client 1 (entity 1106) has a strong relationship with the DNS server (entity 1118). However, DNS client 2 (entity 1110) has a weak relationship with the DNS server (entity 1118). In this example, this may make sense because DNS client 1 (entity 1106) is often used by the client (entity 1102) to send lookup requests to the DNS server. In contrast, in this example, DNS client 2 (entity 1110) is rarely used since it is running on the server computer (server computer 1008 in FIG. 10) and it may rarely issue name lookup requests.

In at least one of the various embodiments, the NMC may traverse device relation model 1100 to identify entities that may be closely related together and associate them into a group. For example, in some embodiments, in device relation model 1100, entity 1104, entity 1108, and entity 1112 may be grouped since they each have strong relationships with each other.

Accordingly, in at least one of the various embodiments, the NMC may be arranged to correlate error signals that may be associated with one or more entities that are in the same group to determine that an anomaly may be occurring. Related error signals that may propagate through a group of closely related entities may be recognized as a bigger problem that rises to an actual anomaly.

In at least one of the various embodiments, the NMC may be arranged to have configuration information, including, templates, patterns, protocol information, or the like, for identifying error signals in a group that may have correlations that indicate they indicate an anomaly.

In some embodiments, the NMC may be arranged to capture/monitor incoming and outgoing network traffic for entities in a monitored network. Also, the NMC may be arranged to employ various protocol analysis facilities, such as, state machines, mathematical models, or the like, to track expected/normal operations of different types of entities in a monitored network. Accordingly, in at least one of the various embodiments, the NMC may monitor the state of operations for entities that are working together. For example, a web client entity, such as, entity 1102, may make an HTTP request to web server entity 1104, that in turn triggers the web server entity 1104 to issue a database request to DB client entity 1108 that in turn is provided database server entity 1112. In some embodiments, the NMC may monitor the operation of each entity in the group by observing the network traffic exchanged between the entities in a group. Thus, in some embodiments, if an error at database server entity 1112 causes web client entity 1102 to drop its connection because of a timeout (or the user cancel the request, or repeats the same request before the response is sent), the NMC may be able to correlate the error at database server entity 1112 with the "timeout" error at web client entity 1102 to recognize what may be a serious anomaly.

Figure 12:
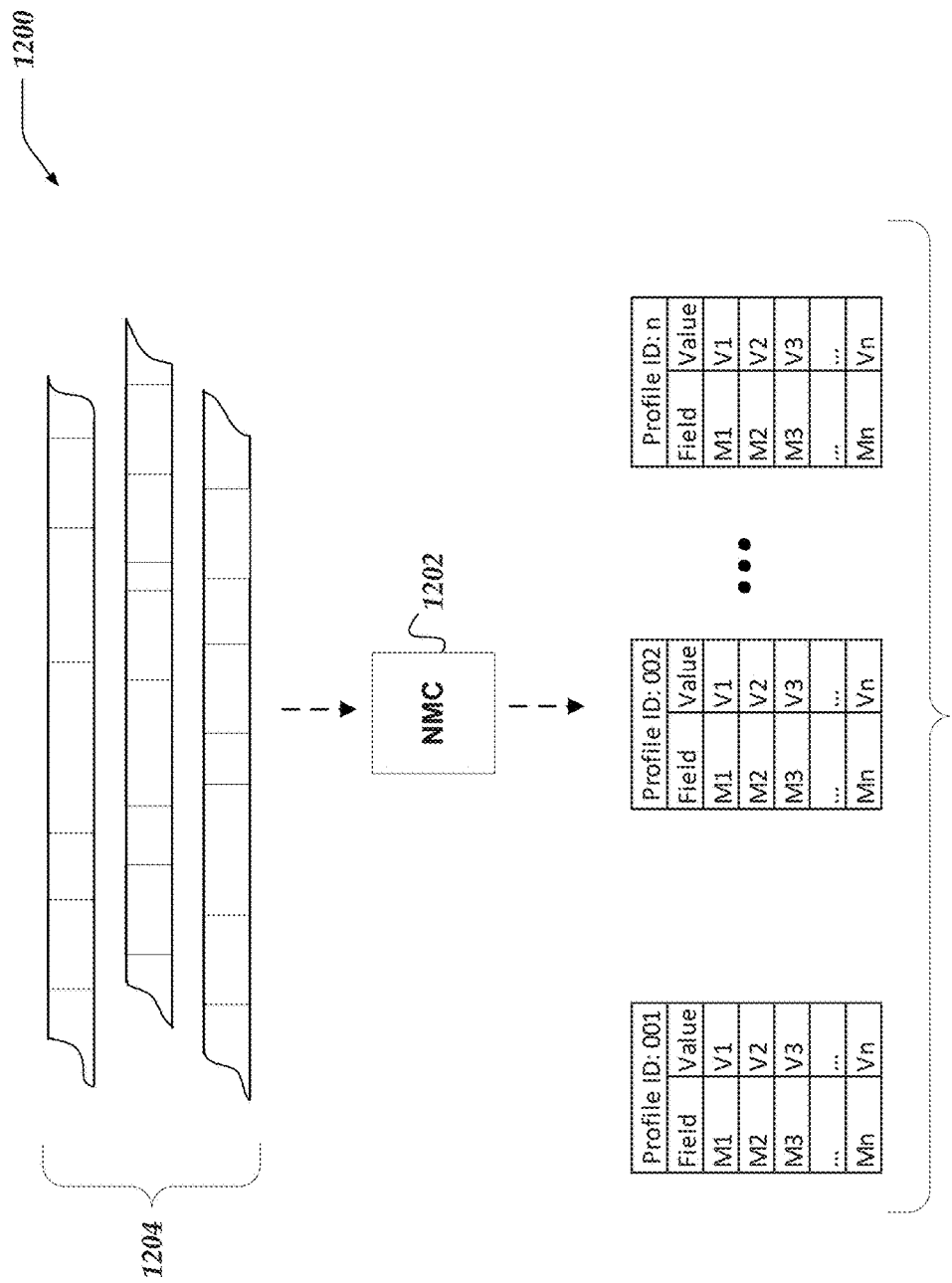
FIG. 12 represents a logical representation of a system for transforming monitored network traffic into anomaly profile objects (e.g., anomaly profiles) or investigation profile objects (e.g., investigation profiles) in accordance with one or more of the various embodiments.

FIG. 12 represents a logical representation of system 1200 for transforming monitored network traffic into anomaly profile objects (e.g., anomaly profiles) or investigation profile objects (e.g., investigation profiles) in accordance with one or more of the various embodiments. In one or more of the various embodiments, NMC 1202 may be arranged to monitor network traffic 1204. As described, in some embodiments, NMC 1202 may be arranged to provide various metrics associated with monitored network traffic 1204.

In one or more of the various embodiments, an NMC may be arranged to transform one or more collected metrics into anomaly profiles suitable for classifying or categorizing one or more anomalous conditions that may be detected in the monitored networks.

Accordingly, in one or more of the various embodiments, as described above, NMCs such as, NMC 1202 may be arranged to collect metrics, portions of the network traffic, traffic attributes, or the like, from monitored network traffic and arrange them into anomaly profiles. In one or more of the various embodiments, anomaly profiles may include collections of one or more fields with values that may be based on network traffic 1204 or metrics associated with network traffic 1202. In one or more of the various embodiments, one or more of the metrics included in an anomaly profile may correspond to metrics collected by the NMC. In other embodiments, one or more of the metrics included in an anomaly profile may be composed of two or more metrics. Also, in one or more of the various embodiments, one or more metrics or features of an anomaly profile may be computed based on one or more observed metrics.

Further, in one or more of the various embodiments, metric values included in anomaly profiles may be normalized or fit to a common schema as well as arithmetically normalized. Normalizing metric values to a common schema may include bucketing values. For example, in some embodiments, observed metrics that have continuous values may be mapped to named buckets, such as high, medium, low, or the like.

In one or more of the various embodiments, NMCs may be arranged to execute one or more ingestion rules to perform pre-processing, such as, the data normalization, that may be required to map observed (raw) metrics into anomaly profile values or features. In one or more of the various embodiments, one or more ingestion rules may be built-in to NMCs while other ingestion rules may be provided via configuration information, plug-ins, rule based policies, user input, or the like.

In one or more of the various embodiments, one or more anomaly profiles may be associated with computer readable instructions that enforce one or more matching rules or filter rules. Accordingly, in one or more of the various embodiments, inference engines may be arranged to execute the one or more matching rules or filters to determine if monitored network activity should be associated with an anomaly profile. In some embodiments, one or more matching rules may be comprised of pattern matching instructions, such as, regular expressions, or the like. In some embodiments, one or more matching rules may be comprised one or more compound or cascading rules or sub-rules for matching network activity to anomaly profiles. In some embodiments, the same network activity may match two or more anomaly profiles.

In one or more of the various embodiments, anomaly profiles may include one or more features that may include threshold values. For example, a traffic flood anomaly profile may include a feature or condition that is met by one or more metrics, such as, the number of connection attempts per minute or second, exceeding a threshold value. Likewise, in some embodiments, anomaly profiles may be associated other features, such as, the occurrence of one or more known error responses, latency or other wait times exceeding a timeout value, unexpected attempts to access protected/critical entities, users performing unexpected or abnormal activity, or the like. Generally, in one or more of the various embodiments, the one or more features that define an anomaly profile may be comprised of one or more metric values, one or more network traffic patterns, or other monitored signals.

In some embodiments, anomaly profiles may be tagged or labeled by the NMCs, users, investigators, or the like. In one or more of the various embodiments, NMCs may be arranged to automatically tag or label anomaly profiles with generated labels or tags based on underlying network traffic associated with the anomaly profile. Likewise, in some embodiments, users, analysts, or investigators may be enabled to add or modify anomaly profile labels or tags to improve reporting, visualizations, human readability, or the like.

In one or more of the various embodiments, anomaly profiles may be employed by inference engines, analysis engines, anomaly engines, or the like, for detecting the occurrence one or more anomalies in a monitored network. Accordingly, in one or more of the various embodiments, metrics related to the occurrence of network traffic associated with anomaly profiles may be collected or tracked. For example, the number of times network traffic associated with a particular anomaly profile may be recorded as metric.

Similarly, in one or more of the various embodiments, investigation profiles may be determined based on monitoring the network traffic associated with the activity that analysts or investigators perform in response to the occurrence of anomaly. In some embodiments, investigation profiles may be arranged to represent the some or all of the sequence of steps or actions an investigator takes during an investigation.

In some embodiments, during the course of an investigation, an investigator may perform actions associated with two or more investigation profiles. For example, a first investigation profile may include navigating to a web page that displays an error report and a second investigation profile may include the network activity that may be associated with the investigator remote logging into a server computer and view log files in a command console.

In one or more of the various embodiments, an investigation profile may include one or more investigation profiles such that the investigation profile may be considered a compound investigation profile that is comprised of two or more investigation profiles. For example, referring to previous example, a compound investigation profile may include the first investigation profile and the second investigation profile examples described above.

In one or more of the various embodiments, NMCs may be arranged to track investigator activity related to the investigator action in the investigation workspace (e.g., applications for managing or investigating incidents or anomalies), such as, user-interface interactions, viewing reports or visualizations, annotations or comments added by the investigator, or the like. These local activities may be associated with the network activity associated with the investigator actions. Accordingly, in one or more of the various embodiments, the investigation profiles may include a record of local actions and network activity associated with an investigation.

Similar to anomaly profiles, in some embodiments, investigation profiles may be comprised of one or more features that may be associated with one or more metrics or one or more portions of network traffic as described above for anomaly profiles.

Figure 13:
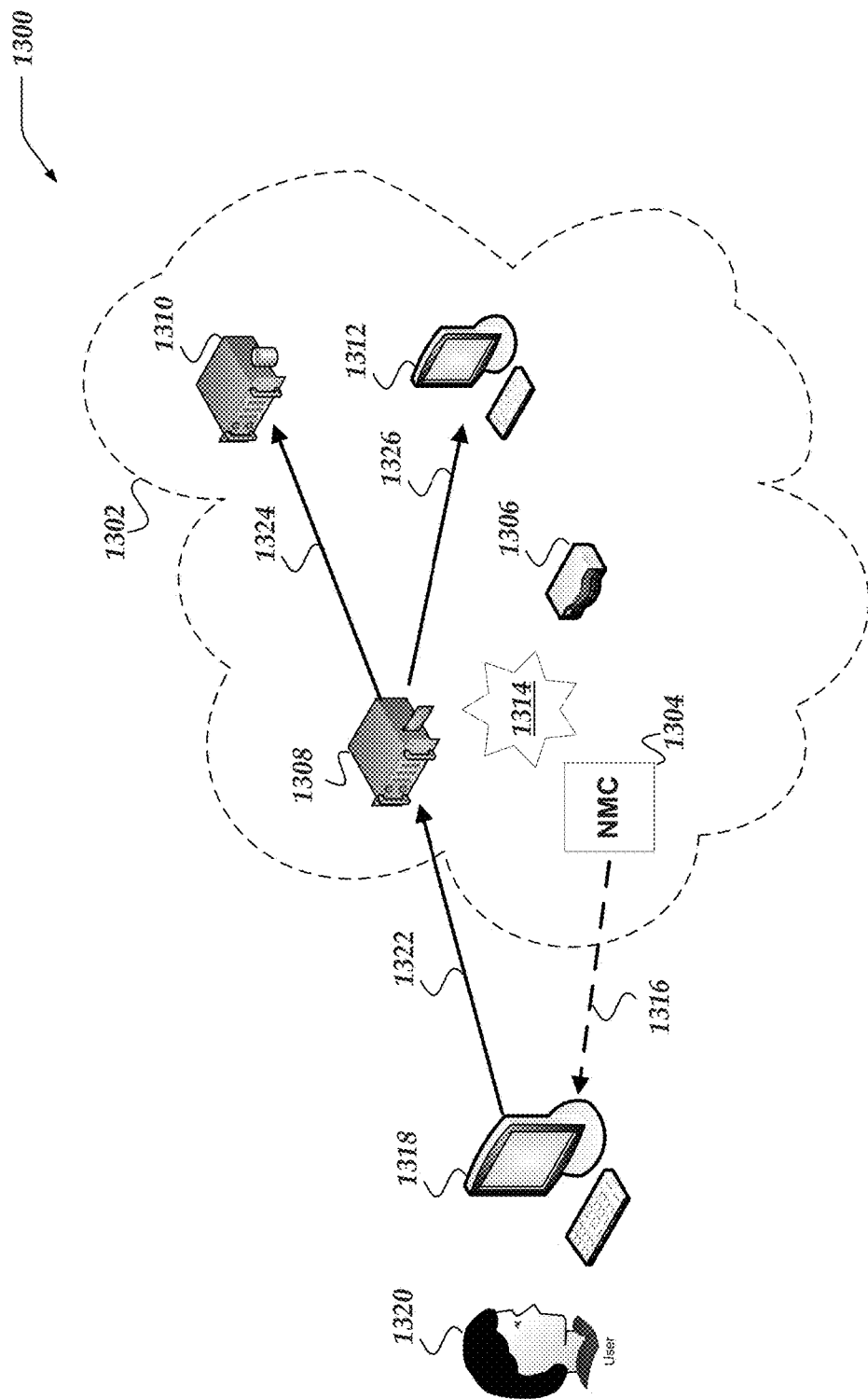
FIG. 13 illustrates a logical schematic of a system for managing incident response operations based on network activity in accordance with one or more of the various embodiments.

FIG. 13 illustrates a logical schematic of system 1300 for managing incident response operations based on network activity in accordance with one or more of the various embodiments. In this example, system 1300 include one or more monitored networks represented by networking environment 1302. In this example, for some embodiments, NMC 1304 may be arranged to monitor network activity that may occur in environment 1302. Accordingly, in this example, NMC 1304 may be arranged to monitor network activity that may be associated with network device 1306, server computer 1308, network computer 1310, desktop computer 1312, or the like. Accordingly, in some embodiments, NMC 1304 may be arranged to monitor network traffic or collect metrics associated with various activities or interactions that may be occur in environment 1302. For brevity and clarity, traces or network paths associated with activity associated with the entities, computers, or devices in environment 1302 are not shown here.

In this example, for some embodiments, anomalous network activity, such as, anomaly 1314, may be detected by NMC 1304. Accordingly, in one or more of the various embodiments, NMC 1304 may associate anomaly 1314 with one or more anomaly profiles and provide a notification, such as, notification 1316, to workstation 1318 which in this example may be operated by a user, such as, investigator 1320. In response to the notification of the occurrence of anomaly 1314, investigator 1320 may be enabled to take various actions to investigation the anomaly. In this example, investigator 1320 may perform actions such as logging into server computer 1308 from workstation 1318. In this example, logging into server computer 1308 may generate network traffic or network activity 1322. Then, in this example, as the investigation into anomaly 1314 continues, investigator 1320 may take one or more other actions, such as, using an application on server computer 1310 or logging into desktop computer 1312, and so on. At the conclusion the investigation, investigator 1320 may indicate that the investigation is completed. In some embodiments, investigator 1320 may be enabled to record additional notes or remarks related to the investigation. Also, in some embodiments, investigator 1320 may be enabled to associate one or more statuses (e.g., success, failure, resolved, unresolved, complete, ignored, or the like) with the investigation.

In one or more of the various embodiments, NMC 1304 may be arranged to monitor the network activity associated with the actions performed by investigator 1320 during the investigation of anomaly 1314. Accordingly, in one or more of the various embodiments, NMC 1304 may generate an investigation profile that based on some or all of the actions performed by investigator 1320 during the investigation anomaly 1314.

In one or more of the various embodiments, NMCs, such as, NMC 1304 may be arranged to associate investigation profiles with the anomaly profiles associated with the anomalies that triggered the investigation in the first place. In some embodiments, this may include associating investigation profiles that had good outcomes as well as investigation profiles that may have had bad outcomes. Accordingly, in one or more of the various embodiments, if an anomaly occurs again, the NMC may provide investigation information to investigators that includes one or more investigation profiles that were previously used during the past investigations of the other anomalies associated with the same anomaly profile other previously encountered anomalies. In some embodiments, this may include investigation profiles that may be associated with successful investigations or unsuccessful investigations as indicated by status information or other metrics associated with the one or more investigation profiles.

Generalized Operations

FIGS. 14-20 represent generalized operations for managing incident response operations based on network activity in accordance with one or more of the various embodiments. In one or more of the various embodiments, processes 1400, 1500, 1600, 1700, 1800, 1900, and 2000 described in conjunction with FIGS. 14-20 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 14-20 may be used for managing incident response operations based on network activity based on network behavior in accordance with at least one of the various embodiments or architectures such as those described in conjunction with FIGS. 4-13. Further, in one or more of the various embodiments, some or all of the actions performed by processes 1400, 1500, 1600, 1700, 1800, 1900, and 2000 may be executed in part by network monitoring engine 322, inference engine 324, analysis engine 326, anomaly engine 327, or the like, running on one or more processors of one or more network computers.

Figure 14:
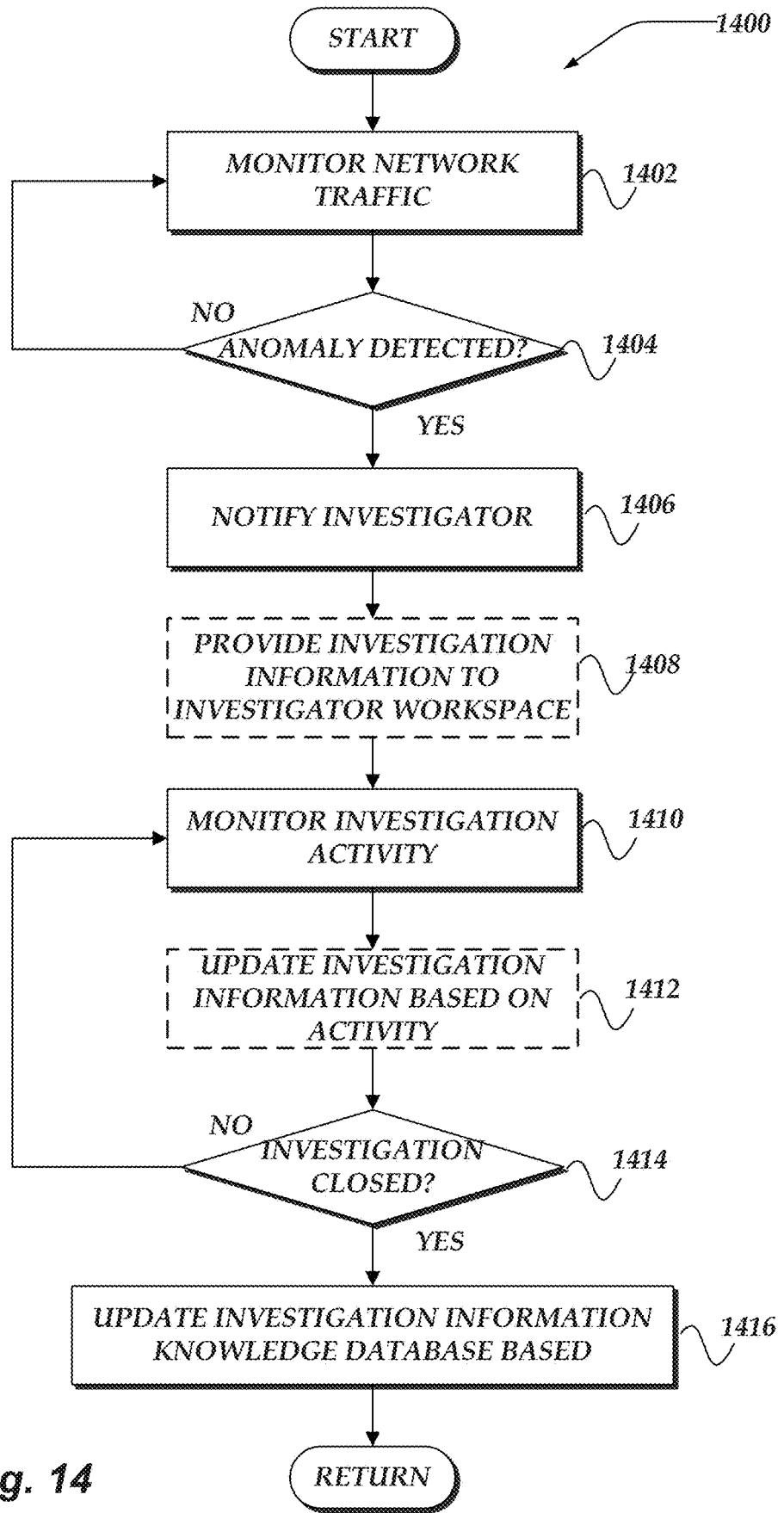
FIG. 14 illustrates an overview flowchart of a process for managing incident response operations based on network activity in accordance with one or more of the various embodiments.

FIG. 14 illustrates an overview flowchart of process 1400 for managing incident response operations based on network activity in accordance with one or more of the various embodiments. After a start block, at block 1402, in one or more of the various embodiments, one or more NMCs may be arranged to collect one or more metrics or other information based on monitoring the network traffic in the monitored networks. As described above, NMCs may be arranged to monitor the network traffic associated with various entities in the monitored networks. In some embodiments, the NMCs may employ some or all of the information collected during monitoring to generate one or more device relation models, anomaly profiles, investigation profiles, investigation models, or the like.

At decision block 1404, in one or more of the various embodiments, if one or more anomalies are detected by one or more NMCs, control may flow to block 1406; otherwise, control may loop back to block 1402. As described above, NMCs may be arranged to include one or more rules for evaluating one or more metrics to evaluate some or all of the monitored network traffic to determine if an anomaly has occurred in the monitored networks.

At block 1406, in one or more of the various embodiments, the one or more NMCs may be arranged to provide one or more notifications to one or more investigators. In one or more of the various embodiments, NMCs may be arranged to provide notification messages that include information about the anomaly to one or more investigators that may be responsible for investigating the anomaly. In some embodiments, the one or more NMCs may be arranged to provide the notification messages to another service that may route the notification to a responsible investigator. In other embodiments, the NMCs may provide a user interface or application that provides an investigator workspace that includes one or more applications that enable the investigator to access one or more dashboards, visualizations, reports, or the like, that may be needed to conduct an investigation of the anomaly.

At block 1408, in one or more of the various embodiments, optionally, the one or more NMCs may be arranged to provide investigation information that may include one or more investigation profiles to one or more investigator workspaces. In some cases, an anomalies may be associated with investigation information that may be provided to the investigator. In some embodiments, anomalies may be associated with anomaly profiles that may be associated with one or more investigation profiles that include one or more recommended actions that an investigator may perform to conduct an investigation of the anomaly.

In one or more of the various embodiments, investigation profiles may include one or more automatic actions such as instructions to display one or more interactive visualizations or interactive reports that may be associated with the anomaly profile associated with the detected anomaly.

In some cases, the investigation information may include a hyperlink or other entry point included in an email, text message, or the like, that the investigator may employ to display or access information or visualizations associated with one or more metrics collected by the NMCs.

In one or more of the various embodiments, the investigation information may include two or more investigation profiles that may be presented in rank order based on the various performance scores or popularity scores that may be associated with investigation profile. For example, if two or more investigation profiles are provided, the investigation profiles may be listed in order of popularity (based on past use by the same or other investigators) reflecting past success of the same or other investigators.

In one or more of the various embodiments, investigators may be enabled to select or open one or more provided investigation profiles to expose or display a list of recommend actions that may be performed to conduct the investigation of the anomalies.

This block is marked optional because in some cases investigation information that may be associated with the detected anomalies may be unavailable.

At block 1410, in one or more of the various embodiments, the one or more NMCs may be arranged to monitor network activity associated with the investigation of the detected anomalies. As the investigator performs various actions to conduct an investigation of the anomaly, NMCs may monitor or record this investigation activity. In some embodiments, the NMCs may monitor the interactions the investigator has with the investigation workspace. For example, the NMCs may be arranged to monitor and track how or where the investigator clicks within the investigator workspace applications. For example, in one or more of the various embodiments, the NMC may track the visualization or reports that are accessed by the investigator during the investigation.

Also, in one or more of the various embodiments, NMCs may be arranged to monitor the network traffic or network activity associated with the investigation of the anomaly. For example, if the investigator connects to another computer in the network, executes queries on remote databases, browses to one or more web sites or web applications, or the like, the NMCs may monitor these actions. In one or more of the various embodiments, the network activity associated with the investigation may be correlated with the local workspace activity.

At block 1412, in one or more of the various embodiments, optionally, the one or more NMCs may be arranged to update or modify the investigation information based on the investigation activity. In some embodiments, as the investigator performs actions, the NMCs obtains more information about investigation being conducted. Accordingly, in some embodiments, this additional information may information the NMCs that additional information, including one or more additional or alternative investigation profiles should be provided to the investigator. For example, as the investigator performs actions to investigate the anomaly, the NMCs may be enabled to provide one or more investigation profiles that are more relevant to the anomaly being investigated.

Likewise, in one or more of the various embodiments, if the NMCs determines that the investigator is not following a recommended investigation profile, it may determine that the current recommendations are insufficient. Thus, the NMC may be arranged to provide additional investigation profiles based on the current investigation activity.

This block is marked optional because in some cases the investigation activity associated with the investigation of the anomalies may not trigger the investigation information that has been provide to the investigators to be updated. For example, the investigator may be following the actions provided in the investigation information.

At decision block 1414, in one or more of the various embodiments, if the investigation is closed, control may flow to block 1416; otherwise, control may loop back to block 1410. At some point, the investigator may determine that the investigation is complete whether it was successful or not. Accordingly, the investigator may be enabled to provide an indication to the NMCs that the investigation of the anomaly is complete. In some embodiments, the investigator may be invited to provide status or outcome information that indicates the success or failure of the investigation.

At block 1416, in one or more of the various embodiments, the one or more NMCs may be arranged to update one or more investigation information data stores or databases based on the actions taken by the investigators, the investigation outcome, or the like. In one or more of the various embodiments, NMCs may be arranged to store information related to the anomalies, investigation activity, recommended investigation profiles, investigation outcomes, or the like. This information may be used to generate additional investigation profiles, improve existing investigation profiles, generate investigation models, or the like. Next, control may be returned to a calling process.

Figure 15:
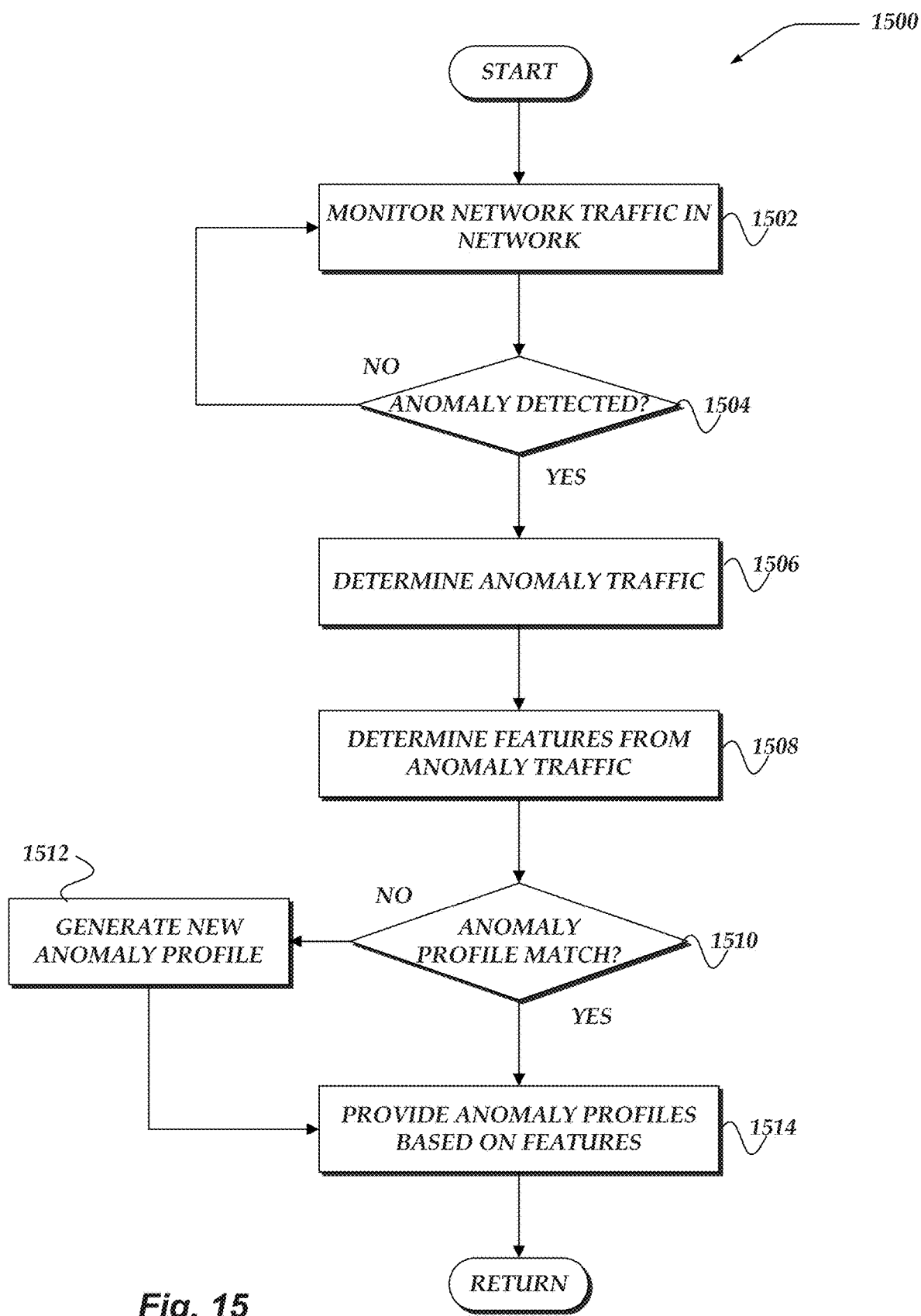
FIG. 15 illustrates a flowchart of a process for providing anomaly profiles based on network activity in accordance with one or more of the various embodiments.

FIG. 15 illustrates a flowchart of process 1500 for providing anomaly profiles based on network activity in accordance with one or more of the various embodiments. After a start block, at block 1502, in one or more of the various embodiments, one or more NMCs may be arranged to collect one or more metrics or other information based on monitoring the network traffic in the monitored networks. As described above, NMCs may be arranged to monitor the network traffic associated with various entities in the monitored networks.

At decision block 1504, in one or more of the various embodiments, if the one or more NMCs detect one or more anomalies, control may flow to block 1506; otherwise, control may loop back to 1504. As described above, NMCs may be arranged to include one or more rules for evaluating one or more metrics or network traffic to determine if an anomaly has occurred in the monitored networks.

At block 1506, in one or more of the various embodiments, the one or more NMCs may be arranged to determine the anomaly traffic from the monitored network traffic. In one or more of the various embodiments, as described above, not all network traffic monitored in the monitored networks may be of interest with respect to the anomaly or anomaly profiles. Accordingly, in one or more of the various embodiments, one or more NMCs may be arranged to filter some or all of the monitored network traffic or otherwise select a portion of the network traffic in the monitored networks associated with network activities that may be of interest.

At block 1508, in one or more of the various embodiments, the one or more NMCs may be arranged to determine one or more features from the anomaly traffic. In some embodiments, NMCs may be arranged to determine one or more metrics to associate with the network traffic. In one or more of the various embodiments, the selected one or more metrics may include one or more metrics collected by the NMC, such as, source, destination, network protocol, application protocol, bit rate, packet size, response latency, or the like, or combination thereof.

In one or more of the various embodiments, the one or more feature values may be arranged into a data structures or records, such as, vectors, lists, arrays, graphs, or the like. In some embodiments, the feature values may be normalized or modified. Likewise, in some embodiments, one or more of the feature values may be associated with discrete categories or otherwise bucketed. For example, in one or more of the various embodiments, one or more features having continuous values may be mapped to discrete values, such as, high, medium, or low.

At decision block 1510, in one or more of the various embodiments, if the one or more features match an existing anomaly profile, control may flow to block 1514; otherwise, control may flow to block 1512.

At block 1512, in one or more of the various embodiments, the one or more NMCs may be arranged to generate a new anomaly profile that may be arranged to match the features of the detected anomaly.

At block 1514, in one or more of the various embodiments, the one or more NMCs may be arranged to provide one or more anomaly profiles based on the determined features. In one or more of the various embodiments, the features associated with the network traffic associated with anomalies may be compared or matched against features associated with the one or more anomaly profiles. In some embodiments, the comparisons may include comparing one or more patterns or masks that correspond to one or more features of the network traffic associated with one or more anomalies. In some embodiments, a single feature such as, a URL associated with a HTTP request, may be sufficient to map network traffic to an anomaly profile.

For example, in some embodiments, one feature interest may include a URL pattern that includes wildcards or positional parameters that may match identifiers or other query values included in the URL. Next, control may be returned to a calling process.

Figure 16:
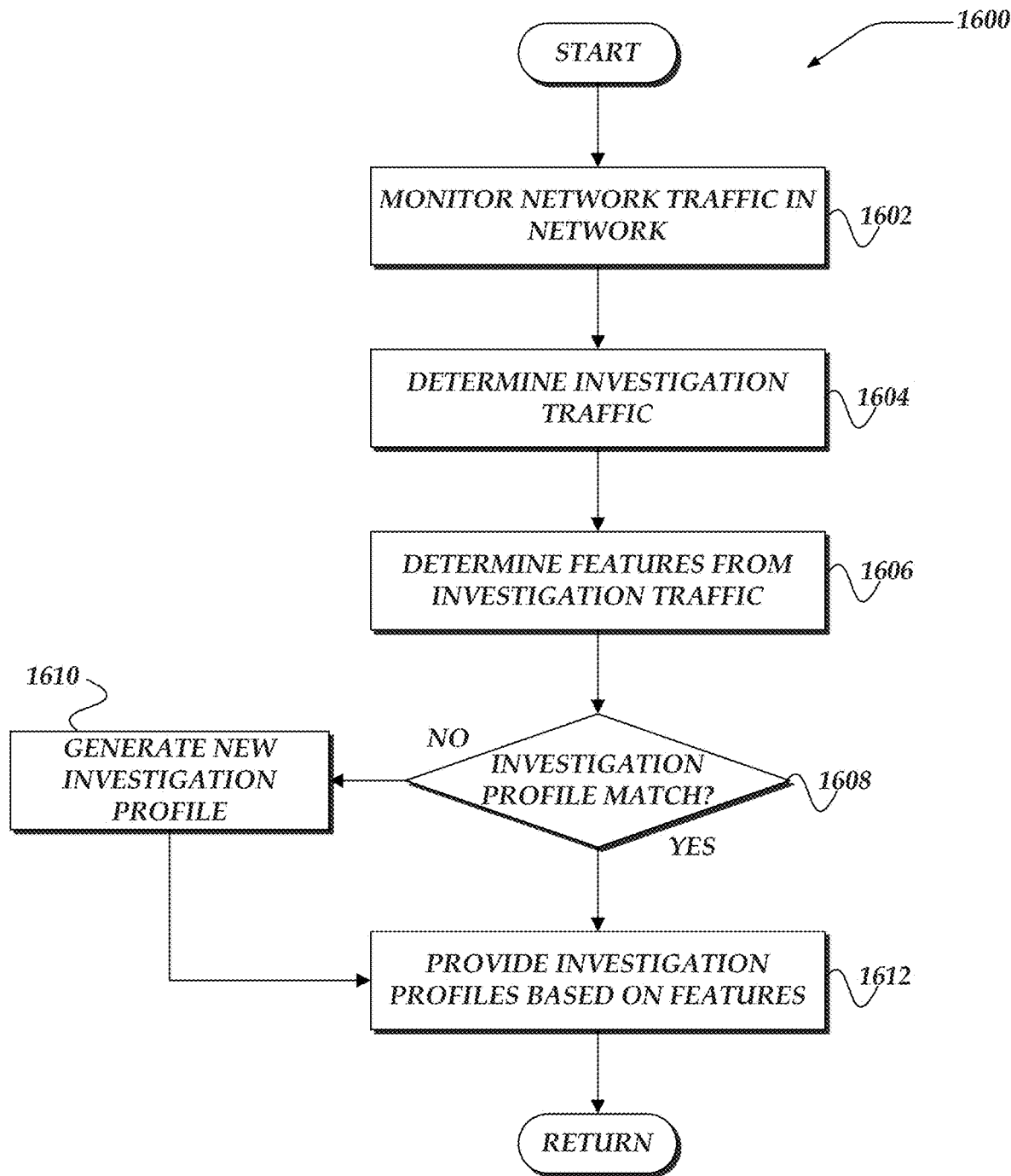
FIG. 16 illustrates a flowchart of a process for providing investigation profiles based on network activity in accordance with one or more of the various embodiments.

FIG. 16 illustrates a flowchart of process 1600 for providing investigation profiles based on network activity in accordance with one or more of the various embodiments. After a start block, at block 1602, in one or more of the various embodiments, one or more NMCs may be arranged to collect one or more metrics or other information based on monitoring the network traffic in the monitored networks. As described above, NMCs may be arranged to monitor the network traffic associated with various entities in the monitored networks.

At block 1604, in one or more of the various embodiments, the one or more NMCs may be arranged to determine investigation traffic from the monitored network traffic. In one or more of the various embodiments, as described above, not all network traffic monitored in the monitored networks may be of interest with respect to investigation profiles. Accordingly, in one or more of the various embodiments, one or more NMCs may be arranged to filter some or all of the monitored network traffic or otherwise select a portion of the network traffic in the monitored networks that may be associated with network activities that may be of interest.

At block 1606, in one or more of the various embodiments, the one or more NMCs may be arranged to determine one or more features from the investigation traffic. In some embodiments, NMCs may be arranged to determine one or more metrics to associate with the network traffic. In one or more of the various embodiments, the selected one or more metrics may include one or more metrics collected by the NMC, such as, source, destination, network protocol, application protocol, bit rate, packet size, response latency, or the like, or combination thereof.

In one or more of the various embodiments, the one or more feature values may be arranged into a data structures or records, such as, vectors, lists, arrays, graphs, or the like. In some embodiments, the feature values may be normalized or modified. Likewise, in some embodiments, one or more of the feature values may be associated with discrete categories or otherwise bucketed. For example, in one or more of the various embodiments, one or more features having continuous values may be mapped to discrete values, such as, high, medium, or low.

At decision block 1608, in one or more of the various embodiments, if the one or more features match an existing investigation profile, control may flow to block 1612; otherwise, control may flow to block 1610.

At block 1610, in one or more of the various embodiments, the one or more NMCs may be arranged to generate a new investigation profile that may be arranged to match the determined features that may be associated with the investigation.

At block 1612, in one or more of the various embodiments, the one or more NMCs may be arranged to provide one or more investigation profiles based on the determined features. In one or more of the various embodiments, the features associated with the network traffic associated with investigation activity performed by investigators investigating one or more anomalies may be compared or matched against features associated with one or more investigation profiles. In some embodiments, the comparisons may include comparing one or more patterns or masks that correspond to one or more features of the network traffic associated with one or more investigation activities. In some embodiments, a single feature such as, a URL associated with a HTTP request, may be sufficient to map network traffic to an investigation profile.

For example, in some embodiments, one feature interest may include a URL pattern that includes wildcards or positional parameters that may match identifiers or other query values included in the URL. Next, control may be returned to a calling process.

Figure 17:
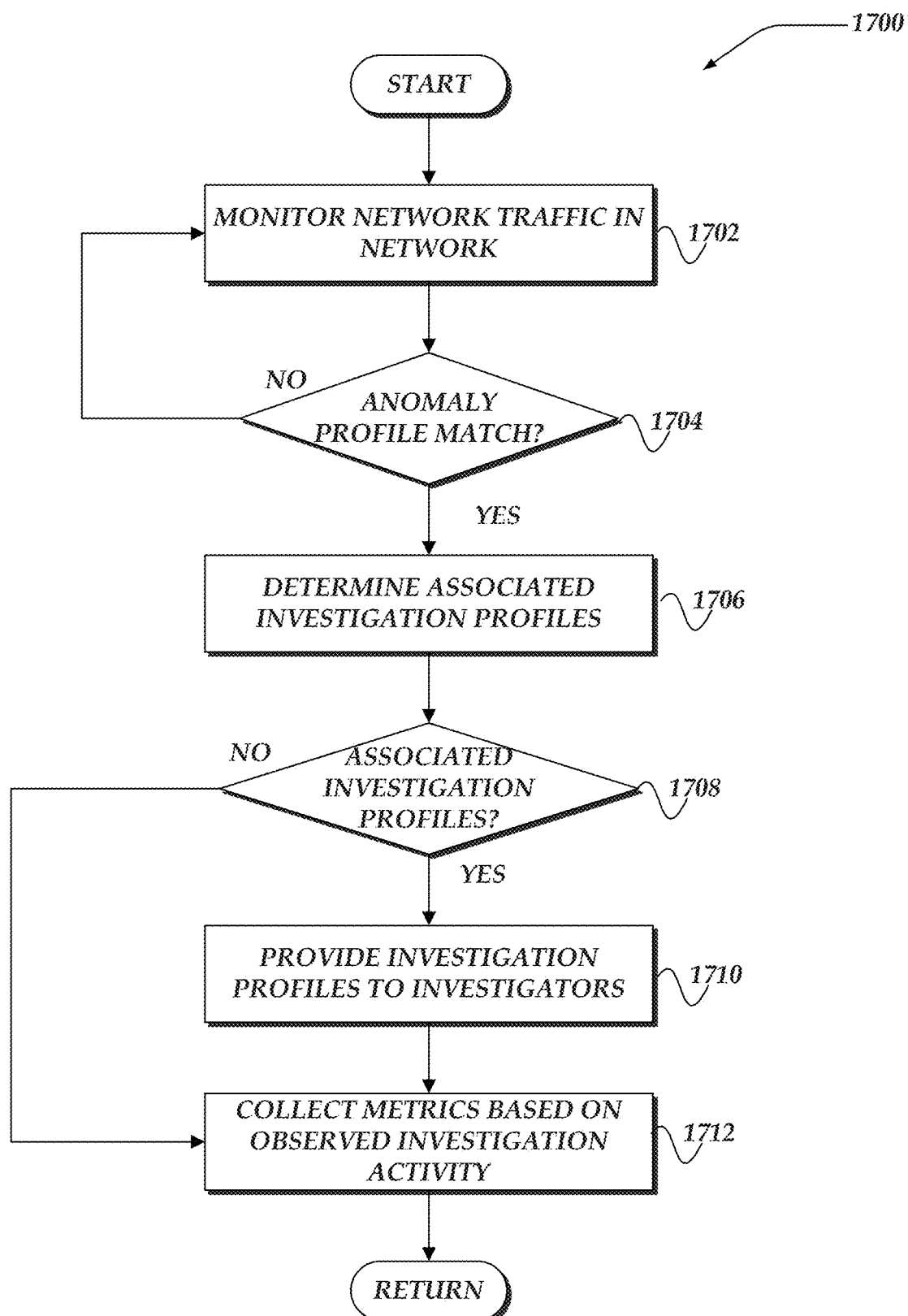
FIG. 17 illustrates a flowchart of a process for managing incident response operations based on network activity using anomaly profiles and investigation profiles in accordance with one or more of the various embodiments.

FIG. 17 illustrates a flowchart of process 1700 for managing incident response operations based on network activity using anomaly profiles and investigation profiles in accordance with one or more of the various embodiments. After a start block, at block 1702, in one or more of the various embodiments, one or more NMCs may be arranged to collect one or more metrics or other information based on monitoring the network traffic in the monitored networks. As described above, NMCs may be arranged to monitor the network traffic associated with various entities in the monitored networks.

At decision block 1704, in one or more of the various embodiments, if the one or more NMCs determines the one or more portions of the network traffic matches or is associated with one or more anomaly profiles, control may flow block 1706; otherwise, control may loop back to block 1702. As described above, in some embodiments, NMCs may be arranged to match or map one or more portions of the network traffic, one or more metrics, or the like, to one or more features that may be used to determine an anomaly profile to associate with the anomaly.

At block 1706, in one or more of the various embodiments, the one or more NMCs may be arranged to determine one or more investigation profiles that may be associated with the one or more anomaly profiles. As described above, NMCs may build up a catalog or database of investigation profiles that may be associated with one or more anomaly profiles. In some embodiments, one or more investigation models may be employed to determine the one or more investigation profiles. In some case, the NMCs may have previously associated one or more investigation profiles with one or more anomaly profiles.

At decision block 1708, in one or more of the various embodiments, if there are one or more associated investigation profiles, control may flow to block 1710; otherwise, control may flow to block 1712. In some embodiments, some anomalies or anomaly profiles may be unassociated with any investigation profiles. For example, if a never before detected anomaly occurs, it may not be associated with an investigation profile.

At block 1710, in one or more of the various embodiments, the one or more NMCs may be arranged to provide the one or more investigation profiles to one or more investigators. As described above, investigation information that includes one or more investigation profiles may be provided to an investigator.

At block 1712, in one or more of the various embodiments, the one or more NMCs may be arranged to collect one or more metrics based on monitored investigation activity. As the investigator performs one or more actions to investigate the anomaly, the NMCs may collect information about the investigation activity and associated with the anomaly profile or investigation profiles (if any). In some embodiments, if there are no associated investigation profiles, the investigation activity may be used to generate a new investigation profile that may be associated with anomaly profile. Accordingly, if the same anomaly is detected in the future, the investigation profile may be provided to the investigator to guide the investigation of the anomaly or other anomalies that are associated with the same anomaly profile. Next, control may be returned to a calling process.

Figure 18:
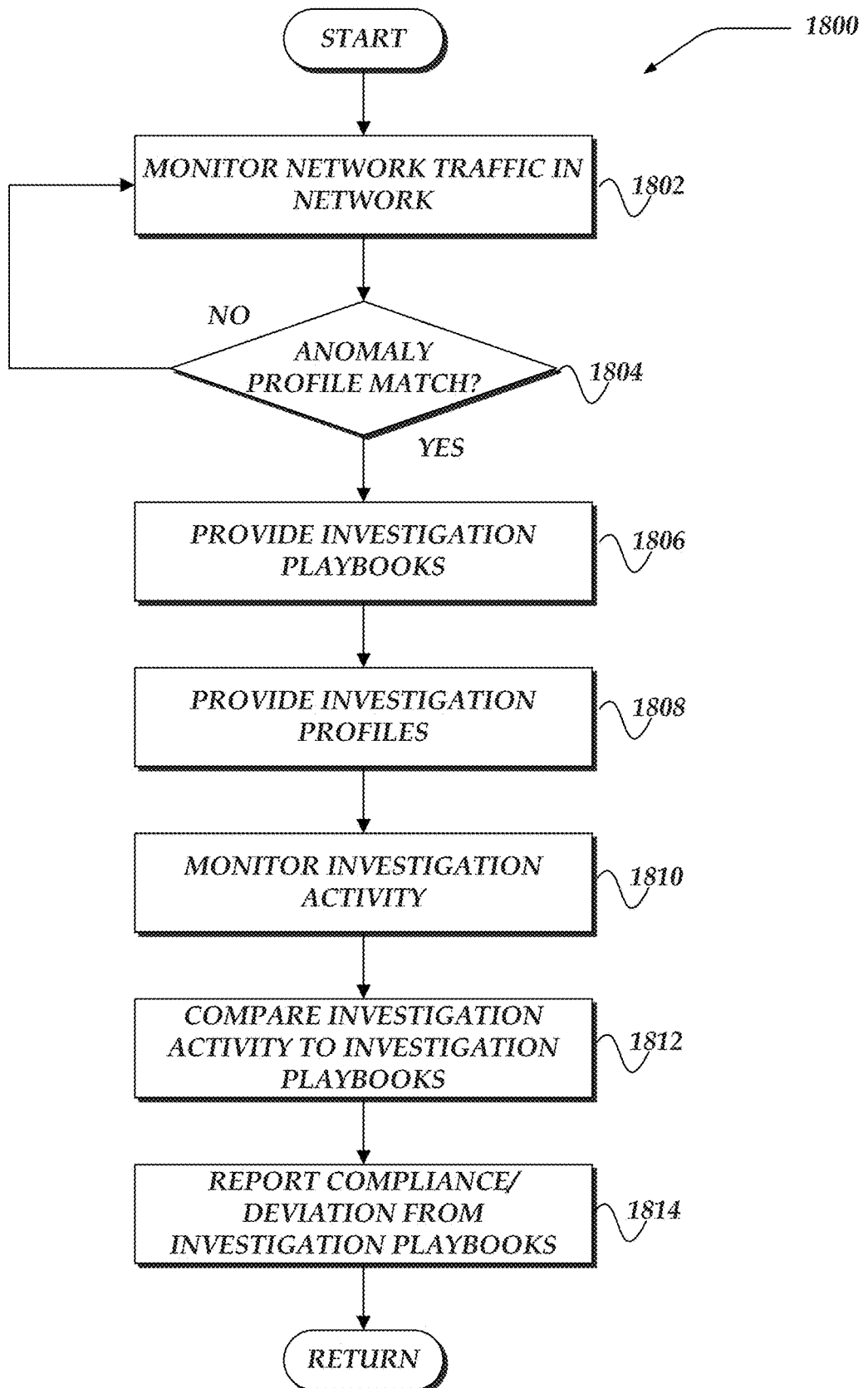
FIG. 18 illustrates a flowchart of a process for managing incident response operations based on network activity in accordance with one or more of the various embodiments.

FIG. 18 illustrates a flowchart of process 1800 for managing incident response operations based on network activity in accordance with one or more of the various embodiments. After a start block, at block 1802, in one or more of the various embodiments, one or more NMCs may be arranged to collect one or more metrics or other information based on monitoring the network traffic in the monitored networks. As described above, NMCs may be arranged to monitor the network traffic associated with various entities in the monitored networks.

At decision block 1804, in one or more of the various embodiments, if the one or more NMCs determines the one or more portions of the network traffic matches or is associated with one or more anomaly profiles, control may flow block 1806; otherwise, control may loop back to block 1902.

At block 1806, in one or more of the various embodiments, the one or more NMCs may be arranged to provide one or more investigation playbooks to one or more investigators. In one or more of the various embodiments, organizations may provide of define investigation playbooks that define specific investigation activity that an investigator should perform during the investigation of some or all anomalies. In some embodiments, some anomalies may have specific investigation playbooks. In other cases, one or more general investigation playbooks may be provided.

In one or more of the various embodiments, investigation playbooks may include one or more checklists, workflows, instructions, or the like, that an investigator may be expected to follow to investigate an anomaly or class of anomalies. In some embodiments, investigation playbooks may be associated with one or more anomaly profiles. Accordingly, in one or more of the various embodiments, if the detected anomaly is associated with an anomaly profile that is associated with an investigation playbook, the NMCs may provide it to the investigator. In some embodiments, the investigator may already have access to one or more investigation playbooks. Accordingly, in some embodiments, the investigator (or the investigation workspace) may provide the investigation playbook rather than the NMC.

At block 1808, in one or more of the various embodiments, the one or more NMCs may be arranged to provide one or more investigation profiles to the one or more investigators. As described above, one or more investigation profiles may be associated with the anomaly profile that may be associated with anomaly. Accordingly, if there are relevant (matching) investigation profiles available, the NMC may provide them to the investigator.

At block 1810, in one or more of the various embodiments, the one or more NMCs may be arranged to monitor the network traffic that may be associated with the investigation activity performed by the one or more investigators. In one or more of the various embodiments, investigators may take various actions to investigate the anomalies. In some embodiments, the investigation profiles or investigation playbooks may provide instructions, checklists, workflows, or the like, that an investigator may use to guide them in the investigation of the anomaly. However, in one or more of the various embodiments, investigators may be enabled to perform investigation activities outside of the activities defined in the investigation profiles or investigation playbooks.

Accordingly, as described above, the NMCs may monitor the investigation activity performed by the investigator, including the activities prescribed by investigation profiles or investigation playbooks and activity not included in investigation profiles or investigation playbooks.

At block 1812, in one or more of the various embodiments, the one or more NMCs may be arranged to compare the investigation activity to the one or more investigation playbooks. In one or more of the various embodiments, NMCs may be arranged to evaluate if the investigator followed the guidance of the investigation profiles or the investigation playbook. For example, if the investigation profile prescribed four actions in a particular order, the NMCs may track if the investigator performed the four actions in the prescribed order. Likewise, if the investigator was using an investigation playbook, the NMCs may track if the investigator performed the actions included in the playbook.

In some embodiments, the actual investigation activity performed by the investigator may be compared to the activity the investigator may report having performed. For example, if the investigator reports that a database backup was performed before debugging the database as part of the investigation of the anomaly, the investigation activity monitored by the NMCs may confirm that the database backup was actually performed.

At block 1814, in one or more of the various embodiments, the one or more NMCs may be arranged to provide one or more compliance or deviation reports based on the comparison of the investigation activity to the investigation playbooks. In one or more of the various embodiments, reports that contain information related to how closely the investigator followed the investigation playbooks or how the investigator followed the investigation profiles may be determined based on the monitor investigation activity. As described above, the NMCs may be monitor the network traffic or network activity associated with each investigation activity. Accordingly, additions or omissions may be noted in a report. For example, if prescribed investigation profile or investigation playbook included ten ordered actions, the NMCs may grade or score the investigation based on how many of the ten actions were performed, the time it took to complete the investigation, how many of other additional actions were performed, or the like.

In some embodiments, the report information may indicate that the investigator is not performing some or all of the actions recommended or prescribed by investigation playbooks or investigation profiles. Likewise, the reports may indicate that an investigation playbook is incorrect or inadequate for the anomaly that was being investigated. Accordingly, in some embodiments, organizations may determine if their current investigation playbooks are sufficient or whether they need to be updating. For example, in some embodiments, a low scoring investigation may represent a poorly designed investigation playbook rather than a poorly performing investigator.

Likewise, in some embodiments, if investigators deviate from investigation profiles this may indicate that the investigation profiles may incorrect for the particular anomaly that was investigated. In this case, it may indicate that the investigation profile should be re-trained, re-optimized, discarded, or the like. Alternatively, in some embodiments, if an investigation model was employed to select the investigation profile, the deviation may be used to evaluate whether the investigation model is selecting relevant investigation profiles or whether the investigation model requires re-training. Next, control may be returned to a calling process.

Figure 19:
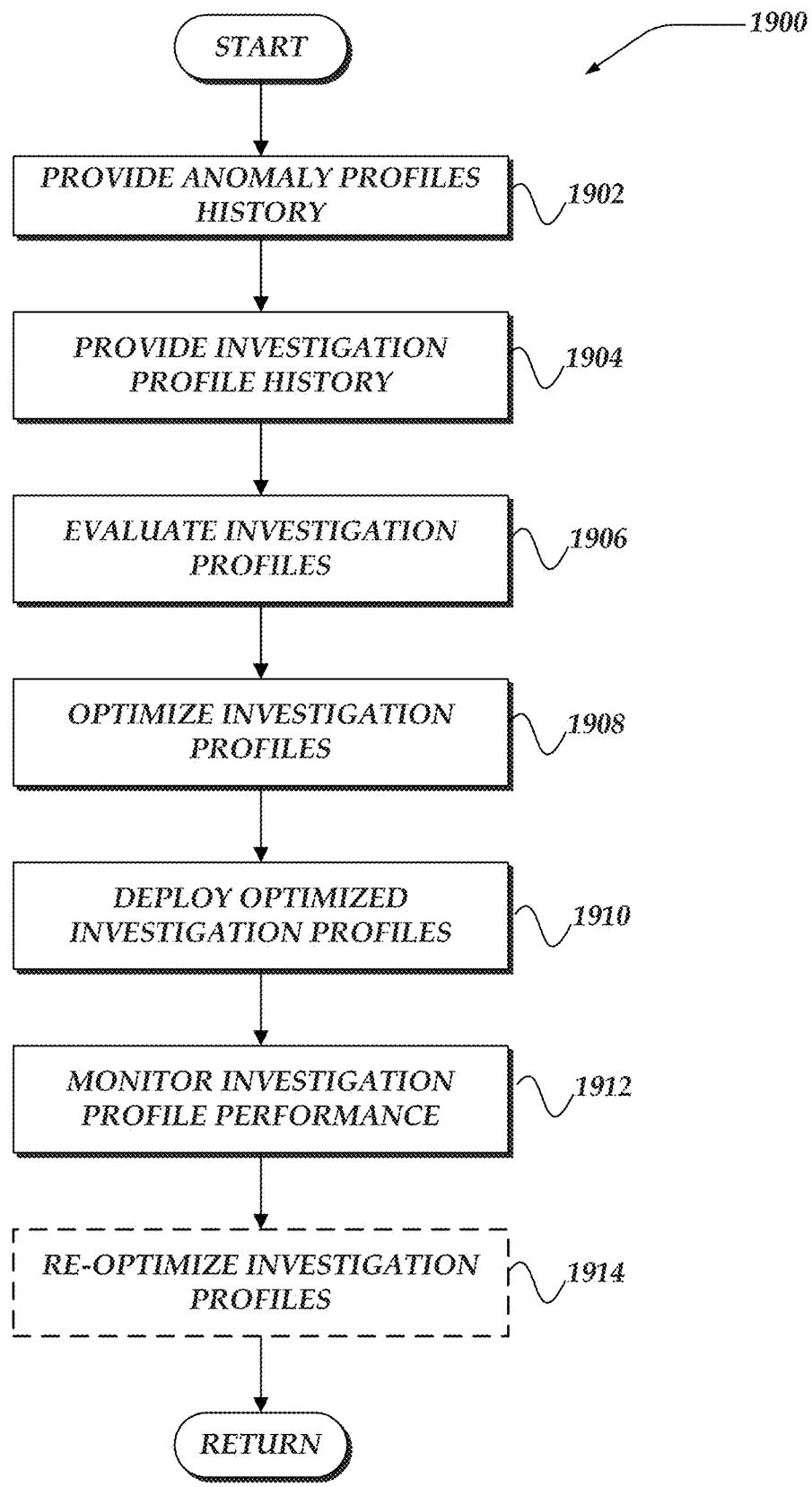
FIG. 19 illustrates a flowchart of a process for training or optimizing improved investigation profiles based on historical anomaly profile activity, historical investigation profile activity, and historical network activity in accordance with one or more of the various embodiments.

FIG. 19 illustrates a flowchart of process 1900 for training or optimizing improved investigation profiles based on historical anomaly profile activity, historical investigation profile activity, and historical network activity in accordance with one or more of the various embodiments. In some embodiments, because some investigation profiles may be generated based on actual network activity performed by investigators they may include redundant actions, risky actions, unnecessary actions, or the like, that may be introduced by investigators that are unfamiliar with some types of anomalies. For example, the first time an anomaly is encountered, investigators may perform one or more exploratory actions that may ultimately be unnecessary to successfully the anomaly. Thus, in some cases, for some embodiments, one or more investigation profiles, especially new investigation profiles, may include actions that could be removed, re-ordered, combined, or the like. Accordingly, in one or more of the various embodiments, inference engines may be arranged to perform one or more actions to attempt to optimize investigation profiles.

After a start block, at block 1902, in one or more of the various embodiments, the one or more NMCs may be arranged to provide anomaly profile history. In one or more of the various embodiments, NMCs may be arranged to track the amount of times that network activity associated with a given anomaly profile has been observed in the one or more monitored networks. In some embodiments, this information may include a data sketch of the network activity that was associated with each anomaly profile. In some embodiments, this may include one or more metrics, such as, time of occurrence, entities in the network associated with the occurrence, duration of the activity, statistical values associated with various metrics (e.g., mean, median, distributions or the like), or the like.

In one or more of the various embodiments, NMCs may be provided (or may capture) network traffic associated with the one or more anomaly profiles. In some embodiments, the captured network traffic may be stored or indexed in other traffic/packet capture data stores. Accordingly, in one or more of the various embodiments, the NMCs may request captured network traffic associated with the one or more anomaly profile. For example, in one or more of the various embodiments, an anomaly profile may be associated with one or more incoming/outgoing network messages, applications, services, ports, protocols, packet header values, packet payload values, or the like, or combination thereof. Accordingly, in this example, NMCs may provide a request (e.g., provide a query) that includes one or more parameter values to select captured network traffic or other historical metrics that may be associated with one or more anomaly profiles.

At block 1904, in one or more of the various embodiments, the one or more NMCs may be arranged to provide investigation profile history. In one or more of the various embodiments, NMCs may be arranged to track the amount of times that network activity associated with a given investigation profile has been observed in the one or more monitored networks. In some embodiments, this information may include a data sketch of the network activity that was associated with each investigation profile. In some embodiments, this may include one or more metrics, such as, time of occurrence, entities in the network associated with the occurrence, duration of the activity, statistical values associated with various metrics (e.g., mean, median, distributions or the like), or the like.

In one or more of the various embodiments, NMCs may be provided (or may capture) captured network traffic associated with the one or more investigation profiles. In some embodiments, the captured network traffic may be stored or indexed in other traffic/packet capture data stores. Accordingly, in one or more of the various embodiments, the NMCs may request captured network traffic associated with the one or more investigation profiles. For example, in one or more of the various embodiments, an investigation profile may be associated with one or more incoming/outgoing network messages, applications, services, ports, protocols, packet header values, packet payload values, or the like, or combination thereof. Accordingly, in this example, NMCs may provide a request (e.g., provide a query) that includes one or more parameter values to select captured network traffic or other historical metrics that may be associated with one or more investigation profiles.

At block 1906, in one or more of the various embodiments, the one or more NMCs may be arranged to evaluate one or more investigation profiles. In one or more of the various embodiments, an inference engine, such as, inference engine 324, or the like, may be arranged to evaluate the one or more investigation profiles based on one or more features of the provided anomaly profiles, investigation profiles, the anomaly profile history, or the investigation profile history.

In one or more of the various embodiments, the historical information collected above may include network activity information, including metrics collected by the NMCs, that show which investigation profiles were used to investigate various anomalies associated with the anomaly profiles.

Accordingly, in one or more of the various embodiments, investigation profiles may be evaluated based on the investigation success rates, average time to complete investigations, number of actions or steps per investigation, or the like.

Also, in one or more of the various embodiments, investigation profiles may be evaluated based on risk factors or performance impacts associated with prescribed investigation actions. In some embodiments, each risk factor or class of risk factors may be associated with a risk score. Likewise, in some embodiments, one or more actions may be associated with performance impact scores. Accordingly, in one or more of the various embodiments, investigation profiles may be associated with an aggregate risk score or aggregate performance score based on the score of the actions prescribed by a given investigation profile.

For example, in some embodiments, risky actions may include, accessing critical entities, using commands that require super-user roles, starting/stopping critical processes, unsecure/unmonitored access of sensitive data, moving or sharing sensitive information, decrypting normally encrypted data, changing users, enabling remote access to sensitive entities, or the like.

Also, for example, in some embodiments, performance impacting actions may include actions that degrade host or network performance, such as, bulk copying, database dumps, backups, restoring from backups, brute force text searches, ad-hoc queries into production databases, queries or searches of unstructured data stores, accessing remote entities or systems having limited bandwidth or computing power, or the like.

In one or more of the various embodiments, NMCs may assign risk or performance impact scores to various actions based on configuration information. Accordingly, organizations may be enabled to adjust risk scores or performance impact scores to various actions based on their operational requirements.

At block 1908, in one or more of the various embodiments, the one or more NMCs may be arranged to optimize one or more investigation profiles. In one or more of the various embodiments, inference engines may be arranged to determine one or more optimizations to improve existing investigation profiles. In some embodiments, inference engines may identify one or more redundant actions that may be eliminated. Also, in some embodiments, an investigation profile may include two or more different actions that produce the same result. For example, an investigation profile may prescribe that an investigator log into computer A to review resource A and then log into computer B to review B even though resource A and resource B may be reviewed directly from the investigators workstation. Accordingly, in this example, an inference engine may detect the unnecessary remote access to computers A and B and recommend that the steps of logging into computer A and computer B be removed from the investigation profile.

Likewise, for example, inference engines may be arranged to re-order one or more actions to reduce the number actions required for an investigation. For example, an investigation profile may prescribe that the investigator log into computer A to review resource A and then logout and perform some intervening steps before logging back into computer A to review resource B. In this example, the inference engine may identify that one logon to computer A may be eliminated if resource A and resource B are reviewed the first time the investigator logs in to computer A.

In some embodiments, inference engines may evaluate one or more investigation profiles to identify one or more activities (e.g., investigator actions, steps, or the like) that may be factored out to simplify or otherwise reduce the complexity of one or more investigation profiles identified, such as, discovering functionally equivalent investigation profiles that are more efficient.

In one or more of the various embodiments, the one or more NMCs may be arranged to employ one or more heuristics it identify one or more circumstances that may be suitable for optimizations. In some embodiments, these heuristics may be defined using computer readable instructions that may be built-in, provided by configuration information, provided by plugins, or the like.

Also, in one or more of the various embodiments, NMCs may employ machine learning to learn one or more investigation profiles that may perform better for some anomaly profiles than the investigation profiles typically or previously used by investigators. In some embodiments, machine learning may identify that investigators may be using sub-optimal investigation profiles to investigate a given set of anomalies. In some cases, this may be because investigators are following an investigation playbook that is sub-optimal. Or, in some cases, investigators may be choosing the investigation profiles out of habit and not recognizing subtle differences in anomalies that degrade the performance or efficacy of the investigation profiles they are following.

Accordingly, in one or more of the various embodiments, inference engines may be provided various anomaly profile features as inputs to learn the optimized set of investigation profile features that are likely to produce successful investigations. In some embodiments, this may leverage circumstances where there may be several investigation profiles that are associated with the same anomaly profiles. In such cases, the inference engine may employ machine learning to learn which features from the several investigation profile features may be optimal for investigating a given anomaly. In some cases, inference engine may generate investigation profiles based on learning from the investigation profiles that were generated by monitoring investigation activity performance by investigators.

Also, in one or more of the various embodiments, inference engines may be arranged to employ machine learning to identify groupings of anomalies, anomaly features, investigation profile features, investigation profile actions, or the like, that may be non-obvious. Accordingly, in one or more of the various embodiments, machine learning may discover that several anomalies may have commonalities that may be investigated using the same steps or actions.

At block 1910, in one or more of the various embodiments, the one or more NMCs may be arranged to deploy the one or more optimized investigation profiles for use by investigators to investigate anomalies that may occur in the monitored networks. In one or more of the various embodiments, the one or more optimized investigation profiles may be deployed or activated for monitoring network traffic in the one or more monitored networks. In some embodiments, users or investigators may be enabled to selectively activate or deactivate one or more investigation profiles.

At block 1912, in one or more of the various embodiments, one or more NMCs may be arranged to evaluate the performance of the one or more investigation profiles. In one or more of the various embodiments, investigation profile performance may be monitored in real-time based on network activity in the monitored networks.

In one or more of the various embodiments, investigation profiles may be evaluated based on their success or failure of the investigation of anomalies. In some embodiments, investigation models may be associated with a score that represents the quality of investigation profile recommendations. Accordingly, in some embodiments, poor evaluations may result in this performance score being decreased. Likewise, in some embodiments, good evaluations may result in this performance score being increased. Thus, in some embodiments, if the performance score of an investigation profile falls below a threshold value, the investigation model may be recommended for re-training or deactivation.

In some embodiments, the NMCs may be arranged to tag or flag the one or more investigation profiles that produce poor results. In some embodiments, investigation profiles that have performance scores less than a defined threshold value may be automatically deactivated.

At block 1914, in one or more of the various embodiments, optionally, the one or more NMCs may be arranged to determine one or more investigation profiles for re-optimization. In one or more of the various embodiments, NMCs may be arranged to periodically re-optimize some or all investigation profiles. In some embodiments, all investigation profiles may be automatically selected for re-optimization based on performance scores.

In one or more of the various embodiments, the period for re-optimization investigation profiles may be impacted by other factors, such as, the network activity, anomaly profiles, entities, services, applications, sources, destinations, users, or the like, that may be associated with an investigation profile. For example, one or more investigation profiles associated with mission critical entities may be configured to be re-trained more often than investigation profiles associated with less important entities. As these determinations may be dependent on the operational considerations of the monitored networks, NMCs may be arranged to employ configuration information provided by configuration files, file system policies, built-in defaults, user input, or the like, combination thereof, to determine re-training frequency or re-training sensitivity. Next, control may be returned to a calling process.

Figure 20:
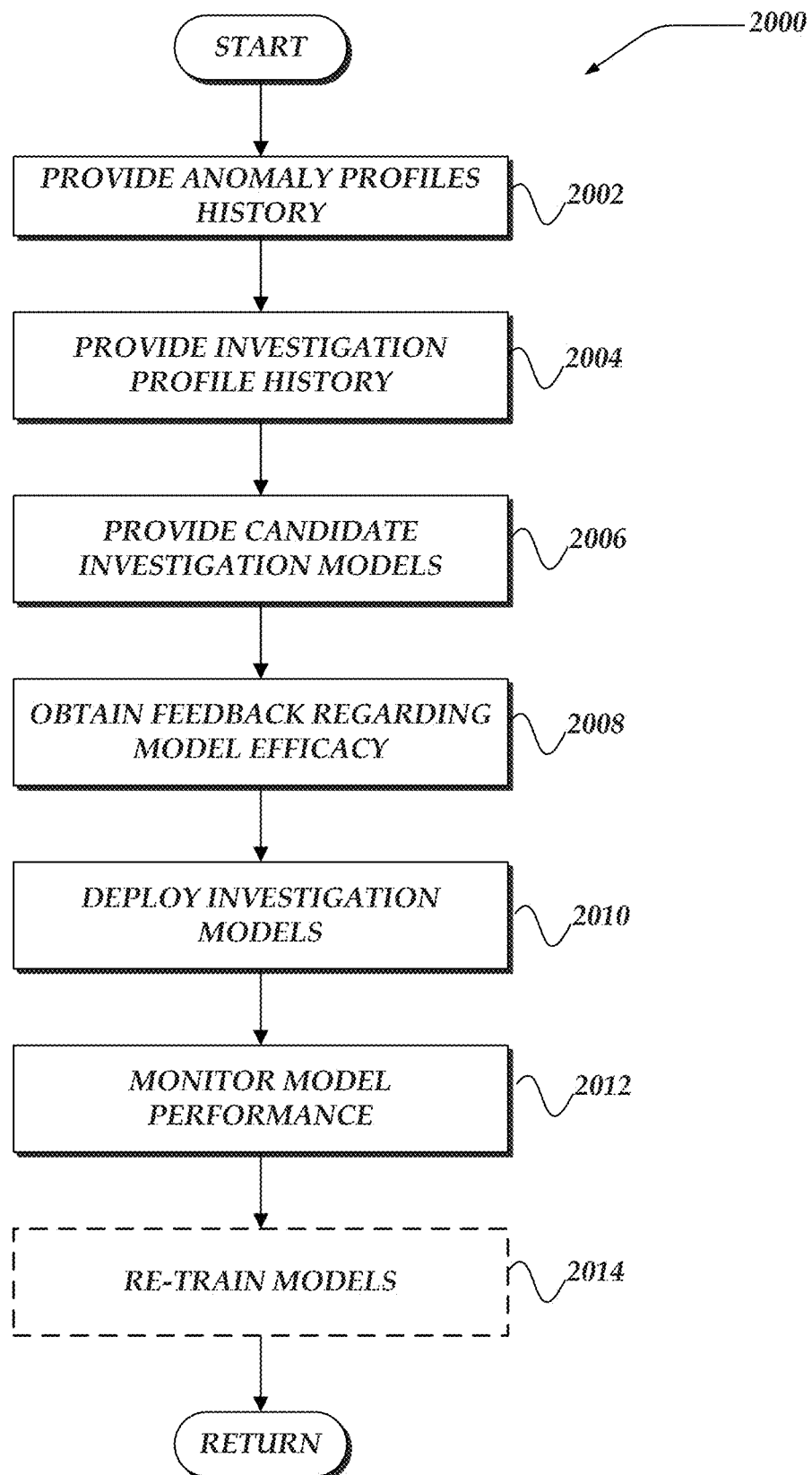
FIG. 20 illustrates a flowchart of a process for providing investigation models based on anomaly profiles, investigation profiles, and network activity in accordance with one or more of the various embodiments.

FIG. 20 illustrates a flowchart of process 2000 for providing investigation models based on anomaly profiles, investigation profiles, and network activity in accordance with one or more of the various embodiments. After a start block, at block 2002, in one or more of the various embodiments, the one or more NMCs may be arranged to provide anomaly profile history as described above in the description for block 1902.

At block 2004, in one or more of the various embodiments, the one or more NMCs may be arranged to provide investigation profile history as described above in the description of block 1904

At block 2006, in one or more of the various embodiments, the one or more NMCs may be arranged to provide one or more candidate investigation models. In one or more of the various embodiments, an inference engine, such as, inference engine 324, or the like, may be arranged to generate the one or more investigation models based on one or more features of the provided anomaly profiles, investigation profiles, the anomaly profile history, or the investigation profile history. In one or more of the various embodiments, the investigation models may be arranged to determine select one or more investigation profiles that may be used investigate one or more anomalies.

In one or more of the various embodiments, investigation models may be arranged to select one or more investigation profiles given one or more anomaly profiles or anomalies. Accordingly, in one or more of the various embodiments, one or more investigation models may include one or more classifiers that may be generated or trained using one or more conventional machine learning techniques.

In one or more of the various embodiments, the historical information collected above may include network activity information, including metrics collected by the NMCs, that show which investigation profiles were used to investigate various anomalies associated with the anomaly profiles. In some embodiments, machine learning may be used to train classifiers that may be used recommend investigation profiles for anomalies that have not been previously encountered.

Also, in one or more of the various embodiments, NMCs may employ machine learning to discover one or more investigation profiles that may perform better for some anomaly profiles than the investigation profiles typically or previously used by investigators. In some embodiments, machine learning may identify that investigators may be using sub-optimal investigation profiles to investigate a given set of anomalies. In some cases, this may be because investigators are following an investigation playbook that is sub-optimal. Or, in some cases, investigators may be choosing the investigation profiles out of habit and not recognizing subtle differences in anomalies that degrade the performance of the investigation profiles they are using.

In one or more of the various embodiments, classifiers trained by machine learning may identify investigation profiles that have fewer steps or a highly likelihood of success than the investigation profiles commonly used to investigate a given anomaly.

At block 2008, in one or more of the various embodiments, the one or more NMCs may be arranged to obtain feedback associated with the one or more candidate investigation models. In one or more of the various embodiments, NMCs may be arranged to provide interactive reports that enable users or investigators to review the investigation models. Accordingly, in one or more of the various embodiments, users or investigators may be enabled score or rate one or more investigation models.

In one or more of the various embodiments, as described above, investigators may be enabled to submit an investigation status or result when an investigation is closed. In some embodiments, the one or more NMCs may be arranged to enable investigators provide additional feedback, such as, grades, ranks, or the like, that may be used to evaluate the investigation profiles that were recommended by an investigation model. Accordingly, in one or more of the various embodiments, if an investigation model is recommending investigation profiles that receive poor grades from investigators, the investigation model may be evaluated poorly.

At block 2010, in one or more of the various embodiments, the one or more NMCs may be arranged to deploy the one or more investigation models for use by investigators to investigate anomalies that may occur in the monitored networks. In one or more of the various embodiments, one or more investigation models may be deployed or activated for monitoring network traffic in the one or more monitored networks. In some embodiments, users or investigators may be enabled to selectively activate or deactivate one or more investigation models.

At block 2012, in one or more of the various embodiments, one or more NMCs may be arranged to evaluate the performance of the one or more investigation models. In one or more of the various embodiments, investigation model performance may be monitored in real-time based on network activity in the monitored networks.

In one or more of the various embodiments, investigation models may be evaluated based on the success or failure of the investigations based on investigation profiles that may be recommended by the investigation models. For example, in some embodiments, in response to the occurrence of an anomaly, an investigation model may select one or more investigation profiles to provide to an investigator. If the investigator follows the investigation profile and the investigation is unsuccessful, the investigation model may receive a poor evaluation. In some embodiments, investigation models may be associated with a score that represents the quality of investigation profile recommendations. Accordingly, in some embodiments, poor evaluations may result in this performance score being decreased. Likewise, in some embodiments, good evaluations may result in this performance score being increased. Thus, in some embodiments, if the performance score falls below a threshold value, the investigation model may be recommended for re-training.

In some embodiments, the NMCs may be arranged to tag or flag the one or more investigation models that receive poor evaluations. In some embodiments, investigation models that receive an evaluation score that is less than a defined threshold value may be automatically deactivated. In some embodiments, this may be considered a temporary adjustment that may remain in effect until the investigation model is re-trained or the evaluation of the investigation model changes.

In one or more of the various embodiments, the one or more NMCs may be arranged to evaluate the performance of investigators based on if they follow the recommended investigation profiles. For example, in some embodiments, investigators that fail to follow recommended investigation profiles and unsuccessfully investigate an anomaly may receive poor evaluations.

Also, for example, investigators that perform additional investigative actions or activity that resolve the investigation when the actions associated with the recommended investigation profiles fail, may receive good evaluations.

At block 2014, in one or more of the various embodiments, optionally, the one or more NMCs may be arranged to determine one or more investigation models for re-training. In one or more of the various embodiments, NMCs may be arranged to periodically re-train some or all investigation models. In some embodiments, all investigation models may be automatically selected for re-training. In other embodiments, one or more investigation models may be selected for re-training based on evaluation scores associated with the investigation models.

In one or more of the various embodiments, the period for re-training investigation models may be impacted by other factors, including investigation model priority, investigation model category, or the like. Accordingly, in one or more of the various embodiments, selecting an investigation model for re-training may depend on various characteristics of the network activity, anomaly profiles, investigation profiles, or the like, that may be associated with the investigation model, such as, entities, services, applications, sources, destinations, users, or the like, or combination thereof. For example, one or more investigation models associated with mission critical entities may be configured to be re-trained more often than one or more investigation models that may be associated with less important entities. As these determinations may be dependent on the operational considerations of the monitored networks, NMCs may be arranged to employ configuration information provided by configuration files, file system policies, built-in defaults, user input, or the like, combination thereof, to determine re-training frequency or re-training sensitivity. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring network traffic using one or more network computers, wherein execution of instructions by the one or more network computers perform the method comprising:
    instantiating a monitoring engine to perform actions, including:
        monitoring network traffic associated with a plurality of entities in one or more networks to provide one or more metrics;
        generating a device relation model for representing direct and indirect relationships between the plurality of entities;
        dynamically modifying the device relation model based on one or more priorities of the one or more direct and indirect relationships to one or more of the plurality of entities, wherein the one or more priorities are based on communication between the plurality of entities that are employed to generate one or more of a type or a weight for the one or more direct and indirect relationships; and
        determining an anomaly based on the one or more metrics exceeding one or more threshold values; and
    instantiating an inference engine that performs actions, including:
        providing an anomaly profile from a plurality of anomaly profiles based on one or more portions of the network traffic that are associated with the anomaly and the device relationship model;
        providing an investigation profile from a plurality of investigation profiles based on the anomaly profile, wherein the investigation profile includes a representation of one or more of classes, types or categorizations and information associated with one or more previously performed investigation activities and results associated with one or more previous investigations of the anomaly;
        monitoring the investigation of the anomaly based on one or more other portions of the network traffic, wherein the one or more other portions of the network traffic are associated with monitoring an occurrence of the one or more investigation activities; and
        modifying a performance score that is associated with the investigation profile based on the occurrence of the one or more investigation activities and a completion status of the investigation, wherein the performance score is decreased when one or more other investigation activities are included in the investigation or when one or more of the one or more investigation activities are omitted from the investigation of the anomaly.

2. The method of claim 1, wherein providing the investigation profile, further comprises:
    providing one or more investigation models that are trained to classify anomaly profiles;
    employing the one or more investigation models to classify the anomaly profile; and
    providing the investigation profile based on a classification of the anomaly profile.

3. The method of claim 1, wherein the inference engine performs further actions, including:
    providing network activity information that is associated with one or more previous occurrences of one or more anomalies;
    providing investigation activity information that is associated with previous investigations associated with one or more investigation profiles and the one or more anomalies; and
    evaluating the one or more investigation profiles based on the investigation activity information associated with previous investigations of the one or more anomalies, wherein the one or more investigation profiles are optimized based on the evaluation.

4. The method of claim 1, wherein the inference engine performs further actions, including:
    providing network activity information that is associated with one or more previous occurrences of one or more anomalies;
    providing investigation activity information and completion results that are associated with previous investigations associated with one or more investigation profiles and the one or more anomalies;
    training one or more investigation models to provide an investigation profile based on an input that includes an input anomaly profile, investigation activity information, and completion results; and
    re-training the one or more investigation models when a confidence score associated with the one or more investigation models is less than a threshold value.

5. The method of claim 1, wherein the inference engine performs further actions, including:
    providing a playbook that defines one or more actions for investigating the anomaly;
    comparing the occurrence of the one or more investigation activities with the one or more actions defined in the playbook to provide a deviation score, wherein the deviation score is associated with a number of the one or more actions that are not performed during the investigation; and
    evaluating an efficacy of the playbook based on the deviation score and the completion result associated with the investigation.

6. The method of claim 1, wherein providing the anomaly profile further comprises:
    providing one or more features associated with the anomaly based on the one or more portions of the network traffic that are associated with the anomaly;
    comparing the one or more features to one or more other features that are associated with the plurality of anomaly profiles; and
    generating the anomaly profile based on a negative result of the comparison, wherein the anomaly profile is generated based on the one or more features.

7. The method of claim 1, wherein the inference engine performs further actions, including, generating the investigation profile based on the one or more other portions of the network traffic that are associated with the one or more investigation activities.

8. The method of claim 1, wherein the inference engine performs further actions, including, providing one or more reports based on the investigation and the completion result, wherein the one or more reports are displayed to one or more users.

9. A processor readable non-transitory storage media that includes instructions for monitoring network traffic using one or more network monitoring computers, wherein execution of the instructions by the one or more network computers perform the method comprising:

instantiating a monitoring engine to perform actions, including:

monitoring network traffic associated with a plurality of entities in one or more networks to provide one or more metrics;

generating a device relation model for representing direct and indirect relationships between the plurality of entities;

dynamically modifying the device relation model based on one or more priorities of the one or more direct and indirect relationships to one or more of the plurality of entities, wherein the one or more priorities are based on communication between the plurality of entities that are employed to generate one or more of a type or a weight for the one or more direct and indirect relationships; and determining an anomaly based on the one or more metrics exceeding one or more threshold values; and instantiating an inference engine that performs actions, including:

providing an anomaly profile from a plurality of anomaly profiles based on one or more portions of the network traffic that are associated with the anomaly and the device relationship model;

providing an investigation profile from a plurality of investigation profiles based on the anomaly profile, wherein the investigation profile includes a representation of one or more of classes, types or categorizations and information associated with one or more previously performed investigation activities and results associated with one or more previous investigations of the anomaly;

monitoring the investigation of the anomaly based on one or more other portions of the network traffic, wherein the one or more other portions of the network traffic are associated with monitoring an occurrence of the one or more investigation activities; and modifying a performance score that is associated with the investigation profile based on the occurrence of the one or more investigation activities and a completion status of the investigation, wherein the performance score is decreased when one or more other investigation activities are included in the investigation or when one or more of the one or more investigation activities are omitted from the investigation of the anomaly.

10. The media of claim 9, wherein providing the investigation profile, further comprises:

providing one or more investigation models that are trained to classify anomaly profiles;

employing the one or more investigation models to classify the anomaly profile; and providing the investigation profile based on a classification of the anomaly profile.

11. The media of claim 9, wherein the inference engine performs further actions, including:

providing network activity information that is associated with one or more previous occurrences of one or more anomalies;

providing investigation activity information that is associated with previous investigations associated with one or more investigation profiles and the one or more anomalies; and evaluating the one or more investigation profiles based on the investigation activity information associated with previous investigations of the one or more anomalies, wherein the one or more investigation profiles are optimized based on the evaluation.

12. The media of claim 9, wherein the inference engine performs further actions, including:

providing network activity information that is associated with one or more previous occurrences of one or more anomalies;

providing investigation activity information and completion results that are associated with previous investigations associated with one or more investigation profiles and the one or more anomalies;

training one or more investigation models to provide an investigation profile based on an input that includes an input anomaly profile, investigation activity information, and completion results; and re-training the one or more investigation models when a confidence score associated with the one or more investigation models is less than a threshold value.

13. The media of claim 9, wherein the inference engine performs further actions, including:

providing a playbook that defines one or more actions for investigating the anomaly;

comparing the occurrence of the one or more investigation activities with the one or more actions defined in the playbook to provide a deviation score, wherein the deviation score is associated with a number of the one or more actions that are not performed during the investigation; and evaluating an efficacy of the playbook based on the deviation score and the completion result associated with the investigation.

14. The media of claim 9, wherein providing the anomaly profile further comprises:

providing one or more features associated with the anomaly based on the one or more portions of the network traffic that are associated with the anomaly;

comparing the one or more features to one or more other features that are associated with the plurality of anomaly profiles; and generating the anomaly profile based on a negative result of the comparison, wherein the anomaly profile is generated based on the one or more features.

15. The media of claim 9, wherein the inference engine performs further actions, including, generating the investigation profile based on the one or more other portions of the network traffic that are associated with the one or more investigation activities.

16. The media of claim 9, wherein the inference engine performs further actions, including, providing one or more reports based on the investigation and the completion result, wherein the one or more reports are displayed to one or more users.

17. A system for monitoring network traffic in a network:

one or more network computers, comprising:

a transceiver that communicates over the network;

a memory that stores at least instructions; and one or more processors that execute instructions that perform actions, including:

instantiating a monitoring engine to perform actions, including:

monitoring network traffic associated with a plurality of entities in one or more networks to provide one or more metrics;

generating a device relation model for representing direct and indirect relationships between the plurality of entities;

dynamically modifying the device relation model based on one or more priorities of the one or more direct and indirect relationships to one or more of the plurality of entities, wherein the one or more priorities are based on communication between the plurality of entities that are employed to generate one or more of a type or a weight for the one or more direct and indirect relationships; and determining an anomaly based on the one or more metrics exceeding one or more threshold values; and instantiating an inference engine that performs actions, including:

providing an anomaly profile from a plurality of anomaly profiles based on one or more portions of the network traffic that are associated with the anomaly and the device relationship model;

providing an investigation profile from a plurality of investigation profiles based on the anomaly profile, wherein the investigation profile includes a representation of one or more of classes, types or categorizations and information associated with one or more previously performed investigation activities and results associated with one or more previous investigations of the anomaly;

monitoring the investigation of the anomaly based on one or more other portions of the network traffic, wherein the one or more other portions of the network traffic are associated with monitoring an occurrence of the one or more investigation activities; and modifying a performance score that is associated with the investigation profile based on the occurrence of the one or more investigation activities and a completion status of the investigation, wherein the performance score is decreased when one or more other investigation activities are included in the investigation or when one or more of the one or more investigation activities are omitted from the investigation of the anomaly; and one or more client computers, comprising:
a transceiver that communicates over the network;
a memory that stores at least instructions; and
one or more processors that execute instructions that perform actions, including:
providing one or more of the one or more portions of the network traffic.

18. The system of claim 17, wherein providing the investigation profile, further comprises:
providing one or more investigation models that are trained to classify anomaly profiles;
employing the one or more investigation models to classify the anomaly profile; and
providing the investigation profile based on a classification of the anomaly profile.

19. The system of claim 17, wherein the inference engine performs further actions, including:

providing network activity information that is associated with one or more previous occurrences of one or more anomalies;

providing investigation activity information that is associated with previous investigations associated with one or more investigation profiles and the one or more anomalies; and evaluating the one or more investigation profiles based on the investigation activity information associated with previous investigations of the one or more anomalies, wherein the one or more investigation profiles are optimized based on the evaluation.

20. The system of claim 17, wherein the inference engine performs further actions, including:

providing network activity information that is associated with one or more previous occurrences of one or more anomalies;

providing investigation activity information and completion results that are associated with previous investigations associated with one or more investigation profiles and the one or more anomalies;

training one or more investigation models to provide an investigation profile based on an input that includes an input anomaly profile, investigation activity information, and completion results; and re-training the one or more investigation models when a confidence score associated with the one or more investigation models is less than a threshold value.

21. The system of claim 17, wherein the inference engine performs further actions, including:

providing a playbook that defines one or more actions for investigating the anomaly;

comparing the occurrence of the one or more investigation activities with the one or more actions defined in the playbook to provide a deviation score, wherein the deviation score is associated with a number of the one or more actions that are not performed during the investigation; and evaluating an efficacy of the playbook based on the deviation score and the completion result associated with the investigation.

22. The system of claim 17, wherein providing the anomaly profile further comprises:

providing one or more features associated with the anomaly based on the one or more portions of the network traffic that are associated with the anomaly;

comparing the one or more features to one or more other features that are associated with the plurality of anomaly profiles; and generating the anomaly profile based on a negative result of the comparison, wherein the anomaly profile is generated based on the one or more features.

23. The system of claim 17, wherein the inference engine performs further actions, including, generating the investigation profile based on the one or more other portions of the network traffic that are associated with the one or more investigation activities.

24. A network computer for monitoring communication over a network between two or more computers, comprising:
a transceiver that communicates over the network;
a memory that stores at least instructions; and
one or more processors that execute instructions that perform actions, including:
instantiating a monitoring engine to perform actions, including:

monitoring network traffic associated with a plurality of entities in one or more networks to provide one or more metrics;

generating a device relation model for representing direct and indirect relationships between the plurality of entities;

dynamically modifying the device relation model based on one or more priorities of the one or more direct and indirect relationships to one or more of the plurality of entities, wherein the one or more priorities are based on communication between the plurality of entities that are employed to generate one or more of a type or a weight for the one or more direct and indirect relationships; and determining an anomaly based on the one or more metrics exceeding one or more threshold values; and instantiating an inference engine that performs actions, including:

providing an anomaly profile from a plurality of anomaly profiles based on one or more portions of the network traffic that are associated with the anomaly and the device relationship model;

providing an investigation profile from a plurality of investigation profiles based on the anomaly profile, wherein the investigation profile includes a representation of one or more of classes, types or categorizations and information associated with one or more previously performed investigation activities and results associated with one or more previous investigations of the anomaly;

monitoring the investigation of the anomaly based on one or more other portions of the network traffic, wherein the one or more other portions of the network traffic are associated with monitoring an occurrence of the one or more investigation activities; and modifying a performance score that is associated with the investigation profile based on the occurrence of the one or more investigation activities and a completion status of the investigation, wherein the performance score is decreased when one or more other investigation activities are included in the investigation or when one or more of the one or more investigation activities are omitted from the investigation of the anomaly.

25. The network computer of claim 24, wherein providing the investigation profile, further comprises:

providing one or more investigation models that are trained to classify anomaly profiles;

employing the one or more investigation models to classify the anomaly profile; and providing the investigation profile based on a classification of the anomaly profile.

26. The network computer of claim 24, wherein the inference engine performs further actions, including:

providing network activity information that is associated with one or more previous occurrences of one or more anomalies;

providing investigation activity information that is associated with previous investigations associated with one or more investigation profiles and the one or more anomalies; and evaluating the one or more investigation profiles based on the investigation activity information associated with previous investigations of the one or more anomalies, wherein the one or more investigation profiles are optimized based on the evaluation.

27. The network computer of claim 24, wherein the inference engine performs further actions, including:

providing network activity information that is associated with one or more previous occurrences of one or more anomalies;

providing investigation activity information and completion results that are associated with previous investigations associated with one or more investigation profiles and the one or more anomalies;

training one or more investigation models to provide an investigation profile based on an input that includes an input anomaly profile, investigation activity information, and completion results; and re-training the one or more investigation models when a confidence score associated with the one or more investigation models is less than a threshold value.

28. The network computer of claim 24, wherein the inference engine performs further actions, including:

providing a playbook that defines one or more actions for investigating the anomaly;

comparing the occurrence of the one or more investigation activities with the one or more actions defined in the playbook to provide a deviation score, wherein the deviation score is associated with a number of the one or more actions that are not performed during the investigation; and evaluating an efficacy of the playbook based on the deviation score and the completion result associated with the investigation.

29. The network computer of claim 24, wherein providing the anomaly profile further comprises:

providing one or more features associated with the anomaly based on the one or more portions of the network traffic that are associated with the anomaly;

comparing the one or more features to one or more other features that are associated with the plurality of anomaly profiles; and generating the anomaly profile based on a negative result of the comparison, wherein the anomaly profile is generated based on the one or more features.

30. The network computer of claim 24, wherein the inference engine performs further actions, including, generating the investigation profile based on the one or more other portions of the network traffic that are associated with the one or more investigation activities.

* * * * *